United States Patent
Darling et al.

(10) Patent No.: US 7,071,264 B2
(45) Date of Patent: Jul. 4, 2006

(54) BRANCHED POLYMERS AND COATING COMPOSITIONS MADE THEREFROM

(75) Inventors: Thomas Robert Darling, Wilmington, DE (US); Robert John Barsotti, Franklinville, NJ (US); Alexei A. Gridnev, Wilmington, DE (US); Patricia Mary Ellen Sormani, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/886,454

(22) Filed: Jul. 7, 2004

(65) Prior Publication Data

US 2005/0054767 A1    Mar. 10, 2005

Related U.S. Application Data

(60) Provisional application No. 60/501,530, filed on Sep. 9, 2003.

(51) Int. Cl.
*C08F 120/06* (2006.01)

(52) U.S. Cl. ............... 525/327.4; 525/326.1; 525/342; 525/374; 525/383; 525/111; 525/113; 525/157; 525/159; 526/317.1; 427/384

(58) Field of Classification Search .......... 524/556; 525/185, 107, 111, 113, 157, 159, 327.4, 525/326.1, 342, 374, 383; 526/317.1; 427/384; 428/375
See application file for complete search history.

(56) References Cited

U.S. PATENT DOCUMENTS

| | | | |
|---|---|---|---|
| 4,694,054 A * | 9/1987 | Janowicz | 526/93 |
| 4,849,480 A | 7/1989 | Antonelli et al. | |
| 5,010,140 A | 4/1991 | Antonelli et al. | |
| 5,279,862 A | 1/1994 | Corcoran et al. | |
| 5,286,782 A | 2/1994 | Lamb et al. | |
| 5,763,528 A * | 6/1998 | Barsotti et al. | 525/63 |
| 6,221,494 B1 | 4/2001 | Barsotti et al. | |
| 6,297,320 B1 * | 10/2001 | Tang et al. | 525/107 |
| 6,432,483 B1 * | 8/2002 | Jaycox et al. | 427/385.5 |
| 6,624,261 B1 | 9/2003 | Moad et al. | |

FOREIGN PATENT DOCUMENTS

GB    2 076 829    * 12/1981

OTHER PUBLICATIONS

Wiff, D. R.; Altieri, M. S. J. Polymer Sci., Polymer Physics Ed., 23 (1985) 1165-1176.
D. B. Johns, R. W. Lenz and A. Leucke: "Lactones", in K. J. Ivan and T. Saegusa, Ed., "Ring Opening Polymerization", Elsevier, NY: 1984, VI, pp. 461-521.

* cited by examiner

*Primary Examiner*—Ling-Sui Choi
(74) *Attorney, Agent, or Firm*—Sudhir G. Deshmukh

(57) ABSTRACT

This invention relates to rapid curing coating compositions that are particularly useful for automotive OEM and refinish applications. The coating composition includes a crosslinkable component that contains a novel highly branched acrylic polymer, and a crosslinking component that contains conventional crosslinking agents, such as polyisocyanate and melamine. This invention is also directed to a process for producing coatings from the rapid curing coating compositions. These compositions are especially useful in providing hard highly crosslinked coatings.

18 Claims, 2 Drawing Sheets

BRANCHED POLYMERS AND COATING COMPOSITIONS MADE THEREFROM

CROSS REFERENCE TO RELATED APPLICATIONS

This application claims priority under 35 U.S.C. § 119 from U.S. Provisional Application Ser. No. 60/501,530, filed Sep. 9, 2003 and which is incorporated by reference herein as if fully set forth.

FIELD OF THE INVENTION

This invention relates to rapid curing coating compositions that are particularly useful for automotive OEM (Original Equipment Manufacture) applications and for automotive refinish applications.

BACKGROUND OF INVENTION

The typical finish on an automobile or truck body comprises an electrodeposited primer layer, an optional primer or primer surfacer layer over the electrodeposited layer and then a pigmented base coat layer and over the pigmented base coat layer, a clear coat layer is applied. A pigmented mono-coat may be used in place of the base coat/clear coat. A number of clear and pigmented coating compositions have been utilized as automotive OEM and automotive refinish coatings, such as, primers, basecoats and clear coats but none meet the rapid curing times that are desired in combination with outstanding physical properties, such as, high hardness and high crosslink density. Such coating compositions can, if desired, have low volatile organic content (VOC).

In refinishing automobiles and trucks, the damaged painted areas having dents, mars and scratches and the like are sanded or ground out by mechanical means in and around the damaged area. Sometimes the original coating is stripped off from a portion or off the entire auto or truck body to expose the substrate (e.g., bare metal) underneath. After repairing the damage, the repaired surface is coated and applied layers are dried and cured.

A key concern of the automobile and truck refinish industry is productivity, i.e., the ability to complete an entire refinish operation in the least amount of time. To accomplish a high level of productivity, any coatings applied need to have the combination of "snap dry" and "through dry" at ambient temperature conditions in a relatively short period of time. The term "snap dry" means that the resulting finish is physically dry to the touch in a relatively short period of time to minimize dirt pick-up and minimize contamination from other sources when the automobile or truck is removed from the spray booth or spray area. The term "through dry" means that the finish is sufficiently cured to allow buffing of the finish.

In automotive OEM, rapid dry and curing of a coating that forms a finish with excellent properties, such as, high coating hardness and crosslink density is very desirable since it is possible to reduce baking temperatures and baking times thereby decreasing productions costs.

Current commercially available coating compositions do not have these unique characteristics of rapidly curing under ambient temperature conditions along with the ability to form a finish having high coating hardness and crosslink density. It would be advantageous to have a coating composition with this unique combination of properties.

STATEMENT OF INVENTION

The present invention is directed to a curable coating composition comprising a crosslinkable component and a crosslinking component wherein said crosslinkable component comprises:

a branched acrylic polymer having a weight average molecular weight ranging from 2000 to 200,000, Tg ranging from −70° C. to +150° C., having on average 2 to 2000 crosslinkable groups, said acrylic polymer resulting from a free radical polymerization of a monomer mixture in the presence of a cobalt-containing chain transfer agent, said monomer mixture comprising at least two unsaturated monomers A and B of the formula:

$$CH_2=CXY$$

wherein, a molar ratio of said monomer A to said monomer B in said monomer mixture ranges from 1.99:1 to 1:9;

in the range of from 75% to 100% of said monomers A and B in said monomer mixture are converted into said polymer;

X for monomer A is H and X for monomer B is $CH_3$;

Y is selected from the group consisting of OR, $O_2CR$, halogen, $CO_2H$, COR, $CO_2R$, CN, $CONH_2$, CONHR, $CONR_2$ and R'; wherein R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, halo, acetoacetyl, and a combination thereof, R' is selected from the group consisting of substituted and unsubstituted aryl, and substituted and unsubstituted heteroaryl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, substituted and unsubstituted alkyl, substituted and unsubstituted aryl, substituted and unsubstituted alkenyl, halo, and acetoacetyl; wherein hetero atom in said heteroaryl group is N, O, P or S, and the number of carbon atoms in:

(i) said alkyl group range from 1 to 18, and
(ii) said aryl group range from 6 to 18; and wherein said crosslinking component for said crosslinkable groups comprises a polyamine, a polyketimine, polyaldimine, polyepoxy, polyisocyanate, polyol, silane, melamine, polyaspartic ester, polyanhydride, polyacid or a combination thereof.

The present invention is further directed to a method for producing a branched acrylic polymer, which comprises:

free radical polymerizing a monomer mixture in the presence of a cobalt-containing chain transfer agent, said monomer mixture comprising at least two unsaturated monomers A and B of the formula:

$$CH_2=CXY$$

wherein, a molar ratio of said monomer A to said monomer B in said monomer mixture ranges from 1.99:1 to 1:9;

in the range of from 75% to 100% of said monomers A and B in said monomer mixture are converted into said polymer;

X for monomer A is H and X for monomer B is $CH_3$;

Y is selected from the group consisting of OR, $O_2CR$, halogen, $CO_2H$, COR, $CO_2R$, CN, $CONH_2$, CONHR, $CONR_2$ and R'; wherein R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, halo, acetoacetyl, and a combination thereof, R' is selected from the group consisting of substituted and unsubstituted aryl, and substituted and unsubstituted heteroaryl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, substituted and unsubstituted alkyl, substituted and unsubstituted aryl, substituted and unsubstituted alkenyl, halo, and acetoacetyl; wherein hetero atom in said heteroaryl group is N, O, P or S, and the number of carbon atoms in:

(i) said alkyl group range from 1 to 18, and (ii) said aryl group range from 6 to 18; and wherein said branched acrylic polymer has on average 2 to 2000 crosslinkable groups, a weight average molecular weight ranging from 2000 to 200,000 and Tg ranging from −70° C. to +150° C.

The present invention is directed to a process for producing a coating on a substrate, said process comprises:

a) mixing a crosslinkable and crosslinking components of a coating composition to form a potmix, wherein said crosslinkable component comprises:

a branched acrylic polymer having a weight average molecular weight ranging from 2000 to 200,000, Tg ranging from −70° C. to +150° C., having on average 2 to 2000 crosslinkable groups, said acrylic polymer resulting from a free radical polymerization of a monomer mixture in the presence of a cobalt-containing chain transfer agent, said monomer mixture comprising at least two unsaturated monomers A and B of the formula:

$$CH_2=CXY$$

wherein, a molar ratio of said monomer A to said monomer B in said monomer mixture ranges from 1.99:1 to 1:9;

in the range of from 75% to 100% of said monomers A and B in said monomer mixture are converted into said polymer;

X for monomer A is H and X for monomer B is $CH_3$;

Y is selected from the group consisting of OR, $O_2CR$, halogen, $CO_2H$, COR, $CO_2R$, CN, $CONH_2$, CONHR, $CONR_2$ and R'; wherein R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, halo, acetoacetyl, and a combination thereof, R' is selected from the group consisting of substituted and unsubstituted aryl, and substituted and unsubstituted heteroaryl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, substituted and unsubstituted alkyl, substituted and unsubstituted aryl, substituted and unsubstituted alkenyl, halo, and acetoacetyl; wherein hetero atom in said heteroaryl group is N, O, P or S, and the number of carbon atoms in:

(i) said alkyl group range from 1 to 18, and (ii) said aryl group range from 6 to 18; and wherein said crosslinking component for said crosslinkable groups comprises a polyamine, a polyketimine, polyaldimine, polyepoxy, polyisocyanate, polyol, silane, melamine, polyaspartic ester, polyanhydride, polyacid or a combination thereof, and;

b) applying a layer of said potmix on said substrate;

c) curing said layer into said coating on said substrate.

DETAILED DESCRIPTION OF PREFERRED EMBODIMENT

Figure 1:
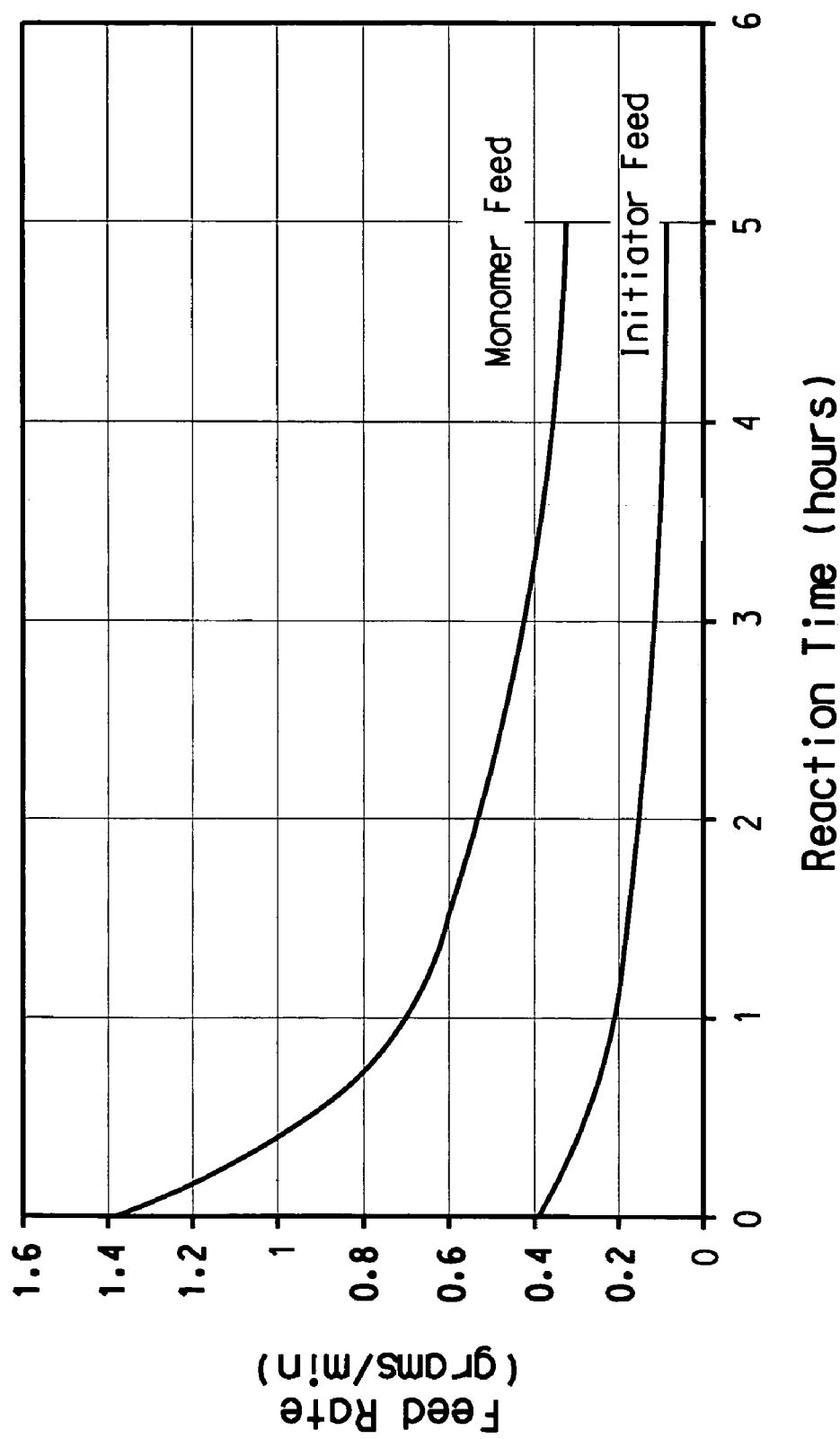
FIG. 1 shows the rates at which the initiator and monomer mixture are fed during the duration of the polymerization of the monomer mixture into a branched polymer.

As used herein:

"High solids composition" means a coating composition having a solids content of above 30 percent, preferably in the range of from 40 to 100 percent, in weight percentages based on the total weight of the composition.

"Number average molecular weight" and "weight average molecular weight" are determined by gel permeation chromatography (GPC) using a high performance liquid chromatograph (HPLC) supplied by Hewlett-Packard, Palo Alto, Calif. Unless stated otherwise, the liquid phase used was tetrahydrofuran and the standard used was polystyrene.

"Polymer solids", "crosslinkable component solids" or "crosslinking component solids" means a polymer or crosslinkable and crosslinking components in their dry state.

"Crosslinkable component" means a component that includes a compound, oligomer, polymer or copolymer having functional groups, which are crosslinkable. Such functional groups are positioned in the backbone of the polymer, pendant from the backbone of the polymer, terminally positioned on the backbone of the polymer, or a combination thereof. One of ordinary skill in the art would recognize that certain crosslinkable group combinations would be excluded from the same crosslinkable component of the present invention, since, if present, these combinations would crosslink among themselves (self-crosslink), thereby destroying their ability to crosslink with the crosslinking groups in the crosslinking components defined below.

"Crosslinking component" is a component that includes a compound, polymer, oligomer or copolymer having crosslinking groups positioned in the backbone of the polymer, pendant from the backbone of the polymer, terminally positioned on the backbone of the polymer, or a combination thereof, wherein these groups are capable of crosslinking with the crosslinkable groups on the crosslinkable component (during the curing step) to produce a coating in the form of crosslinked structures. One of ordinary skill in the art would recognize that certain crosslinking group combinations would be excluded from the same crosslinking component of the present invention, since, if present, these combinations would crosslink among themselves (self-crosslink), thereby destroying their ability to crosslink with the crosslinkable groups in the crosslinkable components. One of ordinary skill in the art would recognize that certain crosslinking group/crosslinkable group combinations would be excluded from the present invention, since they would fail to crosslink and produce the film forming crosslinked structures.

"Branched acrylic polymer" means a highly branched acrylic polymer having on average 2 to 2000, alternately having on average 3 to 200, further alternately having on average 5 to 70 crosslinkable groups per polymer molecule.

"Two-pack coating composition" means a thermosetting composition comprising crosslinkable and crosslinking components that are stored in separate containers, which are typically sealed for increasing the shelf life of the components of the coating composition. The two components are mixed just prior to use to form a pot mix, which has a limited pot life, typically a few minutes, such as 15 minutes to 45 minutes, to a few hours, such as 2 hours to 6 hours. The pot mix is applied as a layer of a desired thickness on a substrate surface, such as, an autobody. After application, the layer dries and cures to form a finish on the substrate surface having desired coating properties, such as high hardness and high crosslinking density. It should be noted that it is within the contemplation of the present invention to store the crosslinkable and crosslinking components in multiple containers, which are then mixed to form the aforedescribed pot mix.

"(Meth)acrylate" means acrylate and methacrylate.

"Tg" (glass transition temperature) of a polymer is a measure of the hardness and melt flow of the polymer. The higher the Tg, the less the melt flow and the harder the coating. Tg is described in Principles of Polymer Chemistry (1953), Cornell University Press. The Tg can be actually measured or it can be calculated as described by Fox in Bull. Amer. Physics Soc., 1, 3, page 123 (1956). Tg, as used herein, refers to the actually measured values. For measurement of the Tg of a polymer, differential scanning calorimetry (DSC) was used.

The use of numerical values in the various ranges specified in this application, unless expressly indicated otherwise, are stated as approximations as though the minimum and maximum values within the stated ranges were both preceded by the word "about." In this manner slight variations above and below the stated ranges can be used to achieve substantially the same results as values within the ranges. Also, the disclosure of these ranges is intended as a continuous range including every value between the minimum and maximum values, including the minimum and maximum end points of the range.

The present invention is directed to a coating composition suited for various coating processes, such as automotive OEM and automotive refinish. The novel coating composition is particularly well suited for use in automotive refinishing used for repairing or refinishing coating auto and truck bodies. Especially, for OEM applications the coating composition can be a one-package composition wherein the crosslinkable and crosslinking components are blended together in one package, wherein the crosslinking groups in crosslinking components are blocked with one or more conventional blocking agents to prevent the premature crosslinking between the two components. After the one pack composition is conventionally applied over substrate surfaces, the layer of the composition is subjected to elevated temperatures to unblock the blocked crosslinking groups to thereby permit crosslinking between the crosslinkable and crosslinking groups. If the crosslinking component includes a melamine, it can be blended with the crosslinkable component since no crosslinking occurs until an applied layer of the composition is baked at an elevated temperature. If the crosslinking component includes a polyisocyanate, it is mixed with the crosslinkable component just before application or if the reactive isocyanate groups on the polyisocyanate are inactivated with a blocking agent that unblocks upon baking, the crosslinking component containing the blocked polyisocyanate can be blended with the crosslinkable component and the composition remains stable.

Generally, when the novel coating composition is used for refinish applications, a two-pack composition is provided in which the crosslinkable component containing the branched polymer is included in one pack and the crosslinking component containing the polyisocyanate is included in the second pack and the two packs are mixed together just before application.

BRANCHED POLYMER

The branched polymer of the present invention is a highly branched acrylic polymer having a weight average molecular weight ranging from 2000 to 200,000, alternately from 5000 to 100,000 and further alternately from 8000 to 60,000, Tg ranging from −70° C. to +150° C., alternately from −40° C. to 100° C., further alternately from −10° C. to 80° C. and still further alternately from 0° C. to 70° C. The branched copolymer is provided with on average 2 to 2000, alternately having on average 3 to 200, further alternately having on average 5 to 70 crosslinkable groups selected from the crosslinkable group consisting of hydroxyl, acetoacetoxy, carboxyl, primary amine, secondary amine, epoxy, isocyanato, silyl, and a combination thereof. The hydroxyl, acetoacetoxy, isocyanato, silyl and secondary amine crosslinkable groups are preferred and hydroxyl is more preferred. It would be clear to one of ordinary skill in the art that certain combinations would be excluded from the foregoing as they tend to self-crosslink. Therefore, a combination of carboxyl, primary or secondary amine and epoxy as crosslinkable groups from the same component would be excluded from the foregoing combinations.

Applicants have unexpectedly discovered process steps that control the architecture of a polymer, namely, decreasing or increasing the branching in the polymer, which is directly proportional to decreasing or increasing its molecular weight.

Applicants discovered that by selecting or choosing a set of reaction conditions, one could predictably achieve the desired polymer architecture. Applicants discovered that when monomers A and B each having a general formula $CH_2$=CXY, wherein X for monomer A is H (acrylate) and X for monomer B is $CH_3$ (methacrylate), are free radical polymerized, a desired combination of polymer architecture can be obtained by selecting fixed starting point conditions from a set of claimed steps. Thus, for example, if one desires a polymer to have a higher degree of branching one would increase the conversion of the monomers A and B into a branched polymer to 100%. For example, to lower the molecular weight, one would select as a starting conditions any one or more of the following starting conditions:

I. Select an A:B molar monomer ratio closer to 1:9 than 1.99:1.
II. Increase the concentration of a chain transfer agent in the monomer mixture.
III. Select a polymerization temperature closer to 170° C. than 80° C.

Inversely, if one desires a polymer to have higher molecular weight, one would select as a starting condition, an A:B monomer molar ratio closer to 1.99:1 than 1:9.

Thus, one can select one or more of the foregoing steps, as fixed starting points that produce a polymer having the aforedescribed desired polymer architecture, namely decreasing or increasing its molecular weight, and/or increasing or decreasing the branching in the polymer.

By way of illustration and without reliance thereon, the highly branched structure of the branched polymer of the present invention can be illustrated in the following fashion:

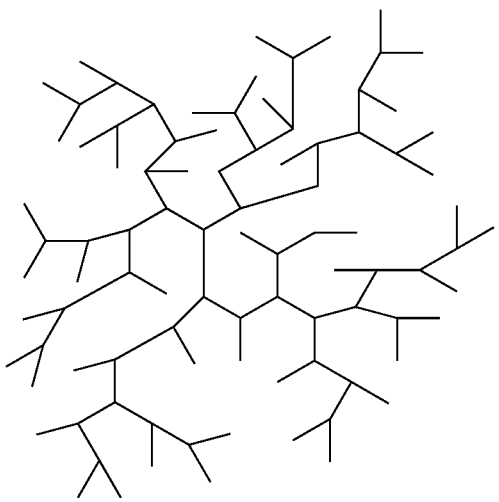

Branched Polymer Structure

Preferably, the branched polymer results from free radical polymerization of a monomer mixture in the presence of a cobalt-containing chain transfer agent. The monomer mixture includes at least two unsaturated monomers A and B of the formula:

$CH_2$=CXY

A molar ratio of the monomer A to the monomer B in the monomer mixture ranges from 1.99:1 to 1:9; alternately from 1.95:1 to 1:8 and further alternately from 1.90:1 to 1:8.

In order to provide the branched structure, the applicants have discovered that 75% to 100%, alternately 80% to 99.8% and further alternately 85% to 99.7% of the A and B monomers in the monomer mixture has to be converted into the branched polymer.

In addition, X for monomer A is H and X for monomer B is $CH_3$; and

Y is selected from the group consisting of OR, $O_2CR$, halogen, $CO_2H$, COR, $CO_2R$, CN, $CONH_2$, CONHR, $CONR_2$ and R'; wherein R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the crosslinkable group consisting of carboxyl, carboxylate, silyl, epoxy, hydroxyl, alkoxy, primary amino, secondary amino, tertiary amino, isocyanato, sulfonyl, halo, and acetoacetyl, R' is selected from the group consisting of substituted and unsubstituted aryl, and substituted and unsubstituted heteroaryl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, substituted and unsubstituted alkyl, substituted and unsubstituted aryl, substituted and unsubstituted alkenyl, halo, and acetoacetyl; and wherein the hetero atom in the heteroaryl group is N, P, O or S, preferably N or O and the number of carbon atoms in:

(i) the alkyl group range from 1 to 18, alternately from 2 to 15, further alternately 3 to 12, and
(ii) the aryl group range from 6 to 18, alternately from 6 to 16, further alternately from 6 to 12.

Some examples of the aforedescribed "A" monomers can include non-functional and functional acrylate monomers. The non-functional acrylate monomer can be provided with one or more groups selected from the group consisting of linear $C_1$ to $C_{20}$ alkyl, branched $C_1$ to $C_{20}$ alkyl, cyclic $C_3$ to $C_{20}$ alkyl, bicyclic or polycyclic $C_5$ to $C_{20}$ alkyl, aromatic with 2 to 3 rings, phenyl, $C_1$ to $C_{20}$ fluorocarbon and a combination thereof. Another example of an 'A' type monomer is styrene or functional styrene, such as para-hydroxy styrene. The functional acrylate monomer can be provided with one or more groups selected from the group consisting of hydroxyl, acetoacetoxy, primary amine, isocyanato, secondary amine, carboxyl, silyl, epoxy and a combination thereof.

Some of the one or more non-functional acrylate monomers in the monomer mixture include methyl acrylate, ethyl acrylate, propyl acrylate, butyl acrylate, pentyl acrylate, hexyl acrylate, octyl acrylate, nonyl acrylate, isodecyl acrylate, and lauryl acrylate; branched alkyl monomers, such as isobutyl acrylate, t-butyl acrylate and 2-ethylhexyl acrylate; and cyclic alkyl monomers, such as cyclohexyl acrylate, methylcyclohexyl acrylate, trimethylcyclohexyl acrylate, tertiarybutylcyclohexyl acrylate and isobornyl acrylate. Isobornyl acrylate and butyl acrylate are preferred. Some of the one or more non-functional methacrylate monomers in the monomer mixture include methyl methacrylate, ethyl methacrylate, propyl methacrylate, butyl methacrylate, pentyl methacrylate, hexyl methacrylate, octyl methacrylate, nonyl methacrylate, isodecyl methacrylate, and lauryl methacrylate; branched alkyl monomers, such as isobutyl methacrylate, t-butyl methacrylate and 2-ethylhexyl methacrylate; and cyclic alkyl monomers, such as cyclohexyl methacrylate, methylcyclohexyl methacrylate, trimethylcyclohexyl methacrylate, tertiarybutylcyclohexyl methacrylate and isobornyl methacrylate. Isobornyl methacrylate and iso-butyl methacrylate are preferred.

Some specific examples of the functional acrylate monomers in the monomer mixture can include hydroxyalkyl acrylates, such as hydroxyethyl acrylate, hydroxy propyl acrylate, hydroxyisopropyl acrylate, isocyanato acrylate, silyl acrylate, hydroxybutyl acrylate; glycidyl acrylate; acrylic acid; acetoacetoxyethyl acrylate and aminoalkyl acrylates, such as tertiarybutylaminoethyl acrylate and N-methylaminoethyl acrylate. Hydroxyethyl acrylate and hydroxybutyl acrylate are preferred.

Some examples of the aforedescribed "B" monomers can include non-functional and functional methacrylate monomers. The non-functional methacrylate monomer can be provided with one or more groups selected from the group consisting of linear $C_1$ to $C_{20}$ alkyl, branched $C_3$ to $C_{20}$ alkyl, cyclic $C_3$ to $C_{20}$ alkyl, aromatic with 2 to 3 rings, phenyl, $C_1$ to $C_{20}$ fluorocarbon and a combination thereof. Another example of an 'B' type monomer is α-methyl styrene or functional α-methyl styrene, such as meta(2-isocyanato isopropyl) α-methyl styrene. The functional methacrylate monomer is provided with one or more groups selected from the group consisting of hydroxyl, primary amine, acetoacetoxy, isocyanato, silyl, secondary amine, carboxyl, epoxy and a combination thereof.

Some of the one or more non-functional methacrylate monomers in the monomer mixture include methyl methacrylate, ethyl methacrylate, propyl methacrylate, butyl methacrylate, pentyl methacrylate, hexyl methacrylate, octyl methacrylate, nonyl methacrylate, isodecyl methacrylate, and lauryl methacrylate; branched alkyl monomers, such as isobutyl methacrylate, t-butyl methacrylate and 2-ethylhexyl methacrylate; and cyclic alkyl monomers, such as cyclohexyl methacrylate, methylcyclohexyl methacrylate, trimethylcyclohexyl methacrylate, tertiarybutylcyclohexyl methacrylate and isobornyl methacrylate. Isobornyl methacrylate and iso-butyl methacrylate are preferred.

Some specific examples of the functional methacrylate monomers in the monomer mixture can include hydroxyalkyl methacrylates, such as hydroxyethyl methacrylate, acetoacetoxy ethyl methacrylate, hydroxy propyl methacrylate, hydroxyisopropyl methacrylate, hydroxybutyl methacrylate; aminoalkyl methacrylates, such as tertiarybutylaminoethyl methacrylate and N-methylaminoethyl methacrylate. Hydroxyethyl methacrylate and hydroxybutyl methacrylate are preferred.

If desired one or more silyl functionalities can be incorporated into the copolymers of the present invention preferably by post reacting hydroxyl functionalities on the branched polymer with isocyanatopropyl trimethoxy silane. The reaction is conducted on an equivalent basis with equivalents of isocyanate, from the isocyanatopropyl trimethoxy silane, to hydroxyl groups, on the branched polymer, ranging from 0.01 to 1.0.

During the polymerization of the aforedescribed monomer mixture, a catalytic amount of one or more cobalt chain transfer agents is employed in the form of cobalt complexes. The concentration of cobalt chain transfer agents can vary from 10 ppm to 20,000 ppm, alternately from 15 to 10,000 and further alternately from 20 to 1,000 ppm, all ppm (parts in weight per million parts in weight) based on the total weight of the monomer mixture. Examples include, but are not limited to, the following cobalt(II) and cobalt(III) chelates:

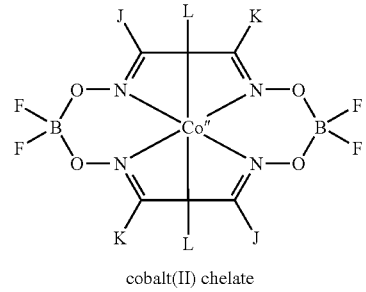

cobalt(II) chelate

Co(II)(DPG-BF$_2$)$_2$ J=K=Ph, L=ligand
Co(II)(DMG-BF$_2$)$_2$ J=K=Me, L=ligand
Co(II)(EMG-BF$_2$)$_2$ J=Me, K=Et, L=ligand
Co(II)(DEG-BF$_2$)$_2$ J=K=Et, L=ligand

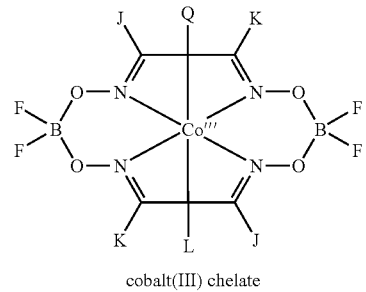

cobalt(III) chelate

QCo(III)(DPG-BF$_2$)$_2$ J=K=Ph, R=alkyl, L=ligand
QCo(III)(DMG-BF$_2$)$_2$ J=K=Me, R=alkyl, L=ligand
QCo(III)(EMG-BF$_2$)$_2$ J=Me, K=Et, R=alkyl, L=ligand
QCo(III)(DEG-BF$_2$)$_2$ J=K=Et, R=alkyl, L=ligand
QCo(III)(CHG-BF$_2$)$_2$ J=K=—(CH$_2$)$_4$—, R=alkyl, L=ligand
QCo(III)(DMG-BF$_2$)$_2$ J=K=Me, R=halo, L=ligand In the foregoing structures BF2 means boron difluoro, Ph means phenyl, Me means methyl, Et means ethyl, halo means fluoro or chloro, CHG means cyclohexyl glyoxime, DPG means diphenyl glyoxime, DMG means dimethyl glyoxime, DEG means diethyl glyoxime and EMG means ethyl methyl glyoxime. Thus for example DPG-BF2 means boron difluoro diphenyl glyoxime. L can be a variety of additional neutral ligands commonly known in coordination chemistry. Examples of ligand include water, amines, ammonia, and phosphines. The cobalt-containing chain transfer agents can also include cobalt complexes of a variety of porphyrin molecules, such as tetraphenylporphyrin, tetraanisylporphyrin, tetramesitylporphyrin and other substituted species. Cobalt(II) in the foregoing structure represented by [Co(II)(DPG-BF2)2] is preferred. Cobalt(III) in the foregoing structure represented by [Co(III)(DMG-BF2)2] is preferred. Both are supplied by E. I. du Pont de Nemours and Company, Wilmington, Del.

In a typical thermally initiated free radical polymerization process, a thermal initiator is added to monomer mixture, typically in an organic solvent or aqueous medium, in a reactor maintained at sufficiently high elevated reaction temperatures for the thermal initiator to undergo scission that results in a chemically reactive free radical. Such free radical then reacts with the monomers present to generate additional free radicals as well as polymer chains. Typical initiators are one or more of any source of radicals or any of the known class of polymerization initiators, provided the initiator has the requisite solubility in the solvent or monomer mixture chosen and has an appropriate half-life at the temperature of polymerization. The initiators may be redox initiators, thermal initiators, photochemical initiators, or a combination thereof, provided the initiator does not poison the cobalt chain transfer agent. The thermal initiators are preferred, particularly, azo initiators, and persulfate initiators. Preferably, the initiator has a half-life of from 1 minute to 1 hour at the temperature of polymerization. Some suitable initiators include ammonium persulfate, azocumene; 2,2'-azobis(isobutyronitrile) (Vazo® 64 thermal initiator supplied by E. I. du Pont de Nemours and Company, Wilmington, Del.); 4,4'-azobis(4-cyanovaleric acid) (Vazo® 52 thermal initiator supplied by E. I. du Pont de Nemours and Company, Wilmington, Del.) and 2-(t-butylazo)-2-cyanopropane. Additional azo initiators include 2,2'-azobis (isobutyronitrile), 2,2'-azobis(2-methylbutanenitrile), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-N-(1,1)-bis (hydoxymethyl)-2-hydroxyethyl] propionamide, 2,2'-azobis [2-methyl-N-hydroxyethyl)]-propionamide, 2,2'-azobis(N, N'-dimethyleneisobutyramidine) dihydrochloride, 2,2'-azobis(2-amidinopropane) dihydrochloride, 2,2'-azobis(N, N'-dimethyleneisobutyramine), 2,2'-azobis(2-methyl-N-[1, 1-bis(hydroxymethyl)-2-hydroxyethyl] propionamide), 2,2'-azobis(2-methyl-N-[1,1-bis(hydroxymethyl) ethyl] propionamide), 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), di-t-butyl hyponitrite, or dicumyl hyponitrite. Other non-azo initiators having the requisite solubility and appropriate half-life may also be used. Such conventional thermal initiators are normally used in amounts of from 0.05 weight percent to 25 weight percent, preferably from 0.1 weight percent to 10 weight percent based on the total weight of the monomer mixture.

CROSSLINKING COMPONENT

The crosslinking component of the present invention suitable for crosslinking with the crosslinkable groups present in the branched polymer in the crosslinkable component is selected from the group consisting of a polyamine, a polyketimine, polyaldimine, polyepoxy, polyisocyanate, polyol, silane, melamine, polyaspartic ester, polyanhydride, polyacid or a combination thereof. It would be clear to one of ordinary skill in the art that generally certain combinations of crosslinking groups from crosslinking components crosslink with crosslinkable groups from the crosslinkable components. Some of those paired combinations include:

1. Ketimine crosslinking component generally crosslinks with acetoacetoxy crosslinkable groups.
2. Polyisocyanate crosslinking components generally crosslink with hydroxyl, primary and secondary amine, and ketimine crosslinkable groups.
3. Epoxy crosslinking component generally crosslinks with carboxyl, anhydride, primary and secondary amine crosslinkable groups.
4. Polyamine crosslinking component generally crosslinks with acetoacetoxy, and epoxy crosslinkable groups.
5. Polyacid crosslinking component generally crosslinks with epoxy crosslinkable groups.
6. Melamine crosslinking components generally crosslink with hydroxyl, crosslinkable groups.

However, it should be noted that combinations of the foregoing paired combinations could also be used.

The suitable polyisocyanate has on average 2 to 10, alternately 2.5 to 8 and further alternately 3 to 8 isocyanate functionalities. Typically the coating composition has a ratio of isocyanate groups on the polyisocyanate in the crosslinking component to crosslinkable groups of the branched polymer ranges from 0.25/1 to 3/1, alternately from 0.8/1 to 2/1, further alternately from 1/1 to 1.8/1.

Examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Additional examples of suitable polyisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2, 4-trimethyl hexamethylene diisocyanate, 2,4,4-trimethyl hexamethylene diisocyanate, dodecamethylene diisocyanate, omega, omega -dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane4,4'-diisocyanate, a toluene diisocyanate, 1,3-bis(1-isocyanato1-methylethyl)benzene, 1,4-bis(1-isocyanato-1-methylethyl)benzene, 1,3-bis(isocyanatomethyl)benzene, xylene diisocyanate, 1,5-dimethyl-2, 4-bis(isocyanatomethyl)benzene, 1,5-dimethyl-2,4-bis(2-isocyanatoethyl)benzene, 1,3,5-triethyl-2,4-bis (isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Penn.), the adduct of 1 molecule of trimethylol propane and 3 molecules of toluene diisocyanate (available under the trademark Desmodur® L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

If desired, the isocyanate functionalities of the polyisocyanate may be capped with a monomeric alcohol to prevent premature crosslinking in a one-pack coating composition. Some suitable monomeric alcohols include methanol, ethanol, propanol, butanol, isopropanol, isobutanol, hexanol, 2-ethylhexanol and cyclohexanol.

When the crosslinking component of the coating composition includes melamine, the composition contains in the range of 10 percent to 40 percent, alternately 20 percent to 40 percent, and further alternately 25 percent to 35 percent, all percentages being weight percentages based on the total weight of the crosslinkable and crosslinking components solids of the melamine.

Some of the suitable melamines include monomeric melamine, polymeric melamine-formaldehyde resin or a combination thereof. The coating composition can include in the range of from 0.1 percent to 40 percent, alternately in the range of from 15 percent to 35 percent, and further alternately in the range of 20 percent to 30 percent of the melamine, the percentages being in weight percentages based on the total weight of composition solids. The monomeric melamines include low molecular weight melamines which contain, on average, three or more methylol groups etherized with a $C_1$ to $C_5$ monohydric alcohol such as methanol, n-butanol, or isobutanol per triazine nucleus, and have an average degree of condensation up to 2 and preferably in the range of 1.1 to 1.8, and have a proportion of mononuclear species not less than 50 percent by weight. By contrast the polymeric melamines have an average degree of condensation of more than 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Suitable polymeric melamines include high imino (partially alkylated, —N, —H) melamine known as Resimene® BMP5503 (molecular weight 690, polydispersity of 1.98, 56% butyl, 44% imino), which is supplied by Solutia Inc., St. Louis, Mo., or Cymel® 1158 provided by Cytec Industries Inc., West Patterson, N.J. Cytec Industries Inc. also supplies Cymel® 1130 @ 80 percent solids (degree of polymerization of 2.5), Cymel® 1133 (48% methyl, 4 % methylol and 48 % butyl), both of which are polymeric melamines.

Melamines can be used along with polyisocyanates, which results in a low VOC coating composition having improved mar and etch resistance. Moreover, the foregoing combination also does not adversely affect other important coating properties, such as, gloss, DOI and other desired coating properties.

Ketimines useful in the present invention are typically prepared by the reaction of ketones with amines. Representative ketones, which may be used to form the ketimine, include acetone, methyl ethyl ketone, methyl isopropyl ketone, methyl isobutyl ketone, diethyl ketone, benzyl methylketone, diisopropyl ketone, cyclopentanone, and cyclohexanone. Representative amines which may be used to form the ketimine include ethylene diamine, ethylene triamine, propylene diamine, tetramethylene diamine, 1,6-hexamethylene diamine, bis(6-aminohexyl)ether, tricyclodecane diamine, N,N'-dimethyldiethyltriamine, cyclohexyl-1,2,4-triamine, cyclohexyl-1,2,4,5-tetraamine, 3,4,5-triaminopyran, 3,4-diaminofuran, and cycloaliphatic diamines. Preparation and other suitable imines are shown in U.S. Pat. No. 6,297,320, herein incorporated by reference. It should be noted that when the copolymer contains only acetoacetoxy functional groups, then ketimine is typically used as a crosslinking component.

Suitable polyamines include primary and secondary amines, such as, ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diminodicyclohexyl methane, isophorone diamine, bis(3-methyl-4-aminocyclohexyl)methane, 2,2-bis(4-aminocyclohexyl)propane, nitrile tris(ethane amine), bis(3-aminopropyl)methylamine, 3-amino-1-(methylamino) propane, 3-amino-1-(cyclohexylamino)propane, and N-(2-hydroxyethyl)ethylene diamine. Ethylenediamine, propylenediamine, butylenediamine and 1,2-diaminocyclohexane are preferred.

Suitable epoxy crosslinking components contain at least two glycidyl groups and can be an oligomer or a polymer, such as sorbitol polyglycidyl ether, mannitol polyglycidyl ether, pentaerythritol polyglycidol ether, glycerol polyglycidyl ether, low molecular weight epoxy resins, such as epoxy resins of epichlorohydrin and bisphenol A., di- and polyglycidyl esters of acids, polyglycidyl ethers of isocyanurates, such as Denacol® EX301 from Nagase. Sorbitol polyglycidyl ether, such as Araldite XYGY-358® from Ciba-Geigy, and di- and polyglycidyl esters of acids, such as Araldite CY-184® from Ciba-Geigy, are preferred since they form high quality finishes.

Suitable polyacid crosslinking components include aliphatic acids, such as succinic, maleic, fumaric, glutaric, adipic, azeleic, and sebacic acids; cycloaliphatic polycarboxylic acids, such as tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, tricyclodecanedicarboxylic acid, cyclohexanetetracarboxylic acid and cyclobutanetetracarboxylic acid; aromatic polycarboxylic acids, such as phthalic acid, isophthalic acid, terephthalic acid, halogenophthalic acids, such as, tetrachloro- or tetrabromophthalic acid, trimellitic acid, and pyromellitic acid. It should be noted that aromatic acid crosslinking components tend to be less durable in clearcoats than aliphatic and cycloaliphatic acid crosslinking components.

The coating composition preferably includes one or more catalysts to enhance crosslinking of the components on curing. Generally, the coating composition includes in the range of from 0.001 percent to 5 percent, preferably in the range of from 0.005 to 2 percent, alternately in the range of from 0.01 percent to 2 percent and further alternately in the range of from 0.01 percent to 1.2 percent of the catalyst, the percentages being in weight percentages based on the total weight of the branched polymer and polyisocyanate and optionally, a melamine.

Some of the suitable catalysts for melamine can include one or more conventional acid catalysts, such as, aromatic sulfonic acids, for example, dodecylbenzene sulfonic acid, para-toluenesulfonic acid and dinonylnaphthalene sulfonic acid, all of which are either unblocked or blocked with an amine, such as, dimethyl oxazolidine and 2-amino-2-methyl-1-propanol, n,n-dimethylethanolamine or a combination of such amines. Other acid catalysts that can be used are strong acids, such as phosphoric acids, more particularly phenyl acid phosphate, which may be unblocked or blocked with an amine.

Some of the suitable catalysts for polyisocyanate can include one or more tin compounds, tertiary amines or a combination thereof; and one or more aforedescribed acid catalyst. Suitable tin compounds include dibutyl tin dilaurate, dibutyl tin diacetate, stannous octoate, and dibutyl tin oxide. Dibutyl tin dilaurate is preferred. Suitable tertiary amines include triethylene diamine. One commercially available catalyst that can be used is Fastcat® 4202 dibutyl tin dilaurate sold by Elf-Atochem North America, Inc. Philadelphia, Penn.

Other Additives

The following additional ingredients can be included in the crosslinkable component of the coating composition in amounts of 0.1% to 98% by weight, alternately in the range of 0.1% to 95% and further alternately in the range of 20% to 80% by weight of the crosslinkable component solids of the composition.

Some of the additional ingredients can include a hydroxyl containing (meth)acrylic polymer, a polyester, an oligomer, a polytrimethylene ether diol, a non-aqueous dispersed (NAD) polymer or a combination thereof.

Particularly useful hydroxyl containing (meth)acrylic polymers have a weight average molecular weight of 2,000 to 20,000 and a Tg from 0° C. to 100° C. and are the polymerization product of typical acrylic monomers, such as, alkyl (meth)acrylate monomers having 1 to 18 carbon atom in the alkyl group and hydroxy functional monomer, such as, hydroxy alkyl (meth)acrylates having 1 to 4 carbon atoms in the alkyl group. The hydroxyl containing (meth) acrylic polymers can be polymerized from a monomer mixture that includes an ethylenically polymerized silane, such as, trimethoxy propyl silyl methacrylate; or tertiarybutylaminoethyl methacrylate. Some of the other suitable acrylic polymers are also listed in U.S. Pat. No. 6,221,494 on column 5, which are incorporated herein by reference.

Typically useful polyesters have a weight average molecular weight ranging from 1500 to 20,000 and a Tg in the range of −50° C. to +100° C. Some of the other suitable polyesters are also listed in U.S. Pat. No. 6,221,494 on column 5 and 6, which is incorporated herein by reference. The suitable polyester is the esterification product of an aliphatic or aromatic dicarboxylic acid, a polyol, a diol, an aromatic or aliphatic cyclic anhydride and a cyclic alcohol. One preferred polyester is the esterification product of adipic acid, trimethylol propane, hexanediol, hexahydrophathalic anhydride and cyclohexane dimethylol.

Typically useful oligomers are provided on average in the range of from 2 to 10, alternately in the range of from 2 to 6 and further alternately in the range of from 2 to 4 with hydroxyl groups. Of these hydroxyl groups, on average at least one, preferably in the range of 1 to 4, alternately in the range of from 2 to 4, must be primary hydroxyl groups. The foregoing average range may be attained by blending reactive oligomers having various number of primary hydroxyl groups. The primary hydroxyl group is a hydroxyl group positioned at the terminal end of the oligomer. A suitable oligomer is a reactive oligomer produced by reacting an oligomeric acid with a monofunctional epoxy. The oligomeric acid is produced by reacting a multifunctional alcohol, such as, pentaerythritol, hexandiol, trimethyol propane with alicyclic monomeric anhydrides, for example, hexahydrophthalic anhydride or methylhexahydrophthalic anhydride. The oligomeric acid is then reacted at a reaction temperature in the range of from 60° C. to 200° C. with a monofunctional epoxy to produce the reactive oligomer. Further details of the useful oligomer are listed in U.S. Pat. No. 6,221,494 on column 3 and 4, which are incorporated herein by reference. Another useful oligomer is a caprolactone oligomer described in U.S. Pat. No. 5,286,782, the description of which is incorporated herein by reference. Such caprolactone oligomers having hydroxyl groups can be made by initiating caprolactone polymerization with a cyclic polyol.

It is known in the art that alcohols (along with certain catalysts), including cyclic alcohols, can be used to initiate the polymerization of caprolactone according to the overall equation:

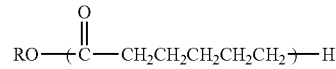

Generally the average degree of polymerization, z, will be the original molar ratio of caprolactone to ROH (or total hydroxyl groups present if ROH were a polyol), assuming the reaction was carried to completion. It is realized by those skilled in the art the product caprolactone oligomer or polymer will have a distribution of degrees of polymerization, z, and that z represents an arithmetic average of that distribution. A general reference for the polymerization of caprolactone is disclosed in D. B. Johns et al., in K. J. Ivan and T. Saegusa, Ed., Elsevier Applied Science Publishers, Barking, Essex, England, 1984, p. 461–521, which is hereby incorporated by reference. The caprolactone oligomers of the following formula are well suited for use in the present invention:

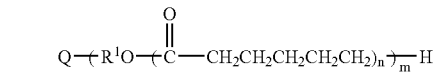

wherein $R^1$ is a covalent bond or alkylene containing 1, 2, 3 or 4 carbon atoms, n ranges from 1 to 4, m is 2, 3 or 4, Q is a saturated carbocyclic ring containing 5 or 6 carbon atoms, preferably 1,4-cyclohexylene; or S—$R^2$—T wherein S and T are each independently saturated carbocyclic rings containing 5 or 6 carbon atoms, and $R^2$ is a covalent bond or an alkylene group containing 1, 2, 3 or 4 carbon atoms, preferably 2,2-propylene or methylene and preferably S and T each are cyclohexylene, more preferably 1,4-cyclohexylene; provided that no more than one $R^1$ is bound to any carbocyclic carbon atom, and further provided that when Q is S—$R^2$—T, each $R^1$ is bound to a carbon atom of the carbocyclic rings of S and T.

The suitable polytrimethylene ether diols can have a number average molecular weight (Mn) in the range of from 500 to 5,000, alternately in the range of from 1,000 to 3,000; a polydispersity in the range of from 1.1 to 2.1 and a hydroxyl number in the range of from 20 to 200. The preferred polytrimethylene ether diol has a Tg of −75° C. Copolymers of polytrimethylene ether diols are also suitable. For example, such copolymers are prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol, wherein at least 50% of the copolymer results from 1,3-propanediol. A blend of a high and low molecular weight polytrimethylene ether diol can be used wherein the high molecular weight diol has an Mn ranging from 1,000 to 4,000 and the low molecular weight diol has an Mn ranging from 150 to 500. The average Mn of the diol should be in the range of 1,000 to 4,000. It should be noted that, the polytrimethylene ether diols suitable for use in the present invention can include polytrimethylene ether triols and other higher functionality polytrimethylene ether polyols in an amount ranging from 1 to 20%, by weight, based on the weight of the polytrimethylene ether diol. It is believed that the presence of polytrimethylene ether diols in the coating composition improves the chip resistance of a coating resulting therefrom.

Typically useful non-aqueous dispersion (NAD) polymer includes in the range of from 10 percent to 90 percent, alternately in the range of from 50 percent to 80 percent all in weight percent based on the weight of the dispersed polymer, of a core formed from high molecular weight polymer having a weight average molecular weight of 50,000 to 500,000, alternately in the range of from 50,000 to 200,000, further alternately in the range of from 50,000 to 150,000. The arms make up 10 percent to 90 percent, alternately 10 percent to 59 percent, all in weight percent based on the weight, of the dispersed polymer. The arms are formed from a low molecular weight polymer having a weight average molecular weight of in the range of from 1,000 to 30,000, alternately in the range of from 3000 to 20,000, further alternately in the range of from 3000 to 15,000.

The core of the dispersed acrylic polymer is comprised of polymerized acrylic monomer(s) optionally copolymerized with ethylenically unsaturated monomer(s). Suitable monomers include styrene, alkyl (meth)acrylate having alkyl carbon atoms in the range of from 1 to 18, alternately in the range of from 1 to 12; ethylenically unsaturated monocarboxylic acid, such as, (meth)acrylic acid, and silane-containing monomers. Other optional monomers include hydroxyalkyl (meth)acrylate or acrylonitrile. Optionally, the core may be crosslinked through the use of diacrylates or dimethacrylates, such as, allyl methacrylate or through post reaction of hydroxyl moieties with polyfunctional isocyanates.

The macromonomer arms attached to the core may be polymerized from monomers, such as alkyl (meth)acrylates having 1 to 12 carbon atoms. Typical hydroxy-containing monomers are hydroxy alkyl (meth)acrylates, described above. Typically useful NAD polymers are disclosed in the following U.S. Patents, which are hereby incorporated by reference: U.S. Pat. Nos. 4,849,480, 5,010,60C, 5,763,528 and 6,221,494.

The crosslinkable component of the coating composition of the present invention can additionally contain a variety of aldimine oligomers, ketimine oligomers and polyaspartic esters, which are described in detail at col. 7, lines 17–33 of U.S. Pat. No. 6,221,494, which is incorporated herein by reference.

The coating composition of the present invention can further contain at least one organic solvent typically selected from the group consisting of aromatic hydrocarbons, such as, petroleum naphtha or xylenes; ketones, such as, methyl amyl ketone, methyl isobutyl ketone, methyl ethyl ketone or acetone; esters, such as butyl acetate or hexyl acetate; and glycol ether esters, such as, propylene glycol monomethyl ether acetate. The amount of organic solvent added depends upon the desired solids level as well as the desired amount of VOC of the composition. If desired, the organic solvent may be added to both the components of the coating composition.

If desired, the amount of the organic solvent used in the present invention can be adjusted to less than 0.6 kilogram (5 pounds per gallon) and preferably in the range of 0.012 kilogram to 0.528 kilogram (0.1 pounds to 4.4 pounds per gallon), more preferably in the range of from 0.12 kilogram to 0.42 kilogram (1.0 to 3.5 pounds per gallon) of organic solvent per liter of the composition.

The solids level of the coating of the present invention can vary in the range of from 5 percent to 100 percent, preferably in the range of from 10 percent to 95 percent and more, preferably in the range of from 25 percent to 85 percent, all percentages being based on the total weight of the coating composition.

To improve weatherability of a clear coating, 0.1 weight percent to 5 weight percent, alternately 1 weight percent to 2.5 weight percent and further alternately 1.5 weight percent to 2 weight percent, based on the weight of the total weight of the crosslinkable and the crosslinking components solids, of an ultraviolet light stabilizer or a combination of ultraviolet light stabilizers and absorbers can be added. These stabilizers include ultraviolet light absorbers, screeners, quenchers and specific hindered amine light stabilizers. Also, 0.1 weight percent to 5 weight percent based on the total weight of the crosslinkable and the crosslinking components solids, of an antioxidant can be added. Most of the foregoing stabilizers are supplied by Ciba Specialty Chemicals, Tarrytown, N.Y.

The coating composition of the present invention can be supplied in the form of a two-pack coating composition in which the firstpack includes the crosslinkable component and the second pack includes the crosslinking component containing polyisocyanate. Generally the first and the second pack are stored in separate containers and mixed before use. The containers are preferably sealed air tight to prevent degradation during storage. The mixing may be done, for example, in a mixing nozzle or in a container. When the crosslinking component contains the polyisocyanate, the curing step can take place under ambient conditions, or if desired, it can take place at elevated baking temperatures.

Alternatively, when the isocyanate functionalities of the polyisocyanate are blocked, both the components of the coating composition can be stored in the same container in the form of a one-pack coating composition. When the crosslinking component contains the blocked polyisocyanate, the curing step takes place at elevated baking temperatures.

If the crosslinking component contains melamine, the coating composition can be formulated as a one-pack coating composition since the melamine does not react with the branched polymer under normal storage conditions and elevated baking temperature is required to cure or crosslink a layer of the coating composition into a coating.

When the crosslinking component contains the polyisocyanate and melamine, the curing step occurs in two stages, first stage taking place under ambient conditions and the second stage-taking place at elevated baking temperatures.

The first pack of the two-pack coating composition contains the crosslinkable component and the second pack contains the crosslinking component, which includes the polyisocyanate. The two packs are mixed just prior to use or 5 to 30 minutes before use to form a potmix. A layer of the potmix is typically applied to a substrate by conventional techniques, such as, spraying, electrostatic spraying, roller coating, dipping or brushing. If used as a clear coating, a layer having a thickness in the range of from 25 micrometers to 75 micrometers is applied over a metal substrate, such as, automotive body, which is often pre-coated with other coating layers, such as an electrocoat, primer and a basecoat. The two-pack coating composition may be dried and cured at ambient temperatures or may be baked upon application for 10 to 60 minutes at baking temperatures ranging from 80° C. to 160° C. The mixture can also contain pigments and can be applied as a mono coat or a basecoat layer over a primed substrate.

When a one-pack coating composition containing a blocked polyisocyanate or a melamine is used, a layer thereof applied over a substrate using afore-described application techniques, is cured at a baking temperature in the range of from 80° C. to 200° C., preferably in the range of 80° C. to 160° C., for 60 to 10 minutes. It is understood that actual baking temperature would vary depending upon the catalyst and blocking agent used and the amount thereof, thickness of the layer being cured and the blocked isocyanate functionalities and the optional melamine utilized in the coating composition. The use of the foregoing baking step is particularly useful under OEM conditions. If desired, the composition can be pigmented to form a colored mono coat, basecoat, or primer. Generally, 0.1% to 200% by weight, based on the total weight of the crosslinkable and crosslinking component solids, of conventional pigments can be added using conventional techniques, such as sand-grinding, ball milling, attritor grinding, two roll milling to disperse the pigments. The mill base is blended with the film-forming constituents. This composition can be applied and cured as described above. The pigment component of this invention may be any of the generally well-known pigments or mixtures thereof used in coating formulations, as reported, e.g., in Pigment Handbook, T. C. Patton, Ed., Wiley-Interscience, New York, 1973. Any of the conventional pigments used in coating compositions can be utilized in the composition such as the following: metallic oxides, such as titanium dioxide, zinc oxide, and iron oxide, metal hydroxide, metal flakes, such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes. If desired chromate-free pigments, such as barium metaborate, zinc phosphate, aluminum triphosphate and mixtures thereof, can also be used. The thickness of the fully cured color coat and clear coat can vary. Generally, when used as a pigmented coating composition, the coating thickness can range from 10 to 75 micrometers, preferably from 12 to 50 micrometers and when used as a primer, the coating thickness can range from 10 to 200 micrometers, preferably from 12 to 100 micrometers.

The coating composition of the present invention is suitable for providing coatings on variety of substrates. The present composition is especially suitable for providing clear coatings in automotive OEM or refinish applications typically used in coating autobodies. The coating composition of the present invention can be formulated in the form of a clear coating composition, pigmented composition, metallized coating composition, basecoat composition, monocoat composition or a primer. The substrate is generally prepared with a primer and or a color coat or other surface preparation prior to coating with the present compositions.

The suitable substrates for applying the coating composition of the present invention include automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft. The substrate further includes industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; golf balls; and sporting equipment.

These compositions are also suitable as clear or pigmented coatings in industrial and maintenance coating applications.

The coating composition of the present invention can also contain conventional additives, such as stabilizers, rheology control agents, flow agents, toughening agents and fillers. Such additional additives will depend on the intended use of the coating composition. Fillers, pigments, and other additives that would adversely effect the clarity of the cured coating will not be included if the composition is intended to be used as a clear coating. The foregoing additives may be added to either the crosslinkable or crosslinking component, or both, depending upon the intended use of the coating composition.

These and other features and advantages of the present invention will be more readily understood, by those of ordinary skill in the art, from a reading of the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

Testing Procedures

The following test procedures were used for generating data reported in the examples below:

Swell Ratio

The swell ratio of a free film (removed from a sheet of TPO—thermoplastic olefin) was determined by swelling the film in methylene chloride. The free film was placed between two layers of aluminum foil and using a LADD punch, a disc of 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few seconds and then a glass slide was placed over the film and the swollen film diameter ($D_s$) was measured. The swell ratio was then calculated as follow:

$$\text{Swell Ratio} = (D_s)^2/(D_o)^2$$

Persoz Hardness Test

The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) were recorded.

Hardness (Fischer)

Hardness was measured using a Fischerscope® hardness tester (the measurement is in Newtons per square millimeter).

MEK Solvent Resistance Test

A coated panel is rubbed (100 times) with an MEK (methyl ethyl ketone) soaked cloth using a rubbing machine and any excess MEK is wiped off. The panel is rated from 1–10. Rating of 10 means no visible damage to the coating, 9 means 1 to 3 distinct scratches, 8 means 4 to 6 distinct scratches, 7 means 7 to 10 distinct scratches, 6 means 10 to 15 distinct scratches with slight pitting or slight loss of color, 5 means 15 to 20 distinct scratches with slight to moderate pitting or moderate loss of color, 4 means scratches start to blend into one another, 3 means only a few undamaged areas between blended scratches, 2 means no visible signs of undamaged paint, 1 means complete failure i.e., bare spots are shown. The final rating is obtained by multiplying the number of rubs by the rating.

Water Spot

Water spot rating is a measure of how well the film is crosslinked early in the curing of the film. If water spot damage is formed on the film, this is an indication that the cure is not complete and further curing of the film is needed before the film can be wet sanded or buffed or moved from the spray both. The water spot rating is determined in the following manner.

Coated panels are laid on a flat surface and deionized water was applied with a pipette at 1 hour timed intervals. A drop about 12.7 mm (½ inch) in diameter was placed on the panel and allowed to evaporate. The spot on the panel was checked for deformation and discoloration. The panel was wiped lightly with cheesecloth wetted with deionized water, which was followed by lightly wiping the panel dry with the cloth. The panel was then rated on a scale of 1 to 10. Rating of 10 best—no evidence of spotting or distortion of discoloration, rating 9—barely detectable, rating 8—slight ring, rating 7—very slight discoloration or slight distortion, rating 6—slight loss of gloss or slight discoloration, rating 5—definite loss of gloss or discoloration, rating of 4—slight etching or definite distortion, rating of 3—light lifting, bad etching or discoloration, rating of 2—definite lifting and rating of 1—dissolving of the film.

Cotton Tack Free Time

Allow coated panel to dry for set period of time (e.g. 30 minutes). Drop a cotton ball from a height of 1 inch onto the surface of the panel and leave the cotton ball on the surface for a set time interval and invert panel. Repeat above until the time the cotton ball drops off of the panel on inversion and note that as the cotton tack free time.

BK Dry Time

Surface drying times of coated panels measured according to ASTM D5895.

Gel Fraction

Measured according to the procedure set forth in U.S. Pat. No. 6,221,494 col. 8, line 56 to col. 9 line 2 that is hereby incorporated by reference.

Viscosity

Measured on an ICI cone & plate viscometer in centipoises at 10,000 sec-1 shear rate.

EXAMPLES

Polymerization Procedure for Branched Polymers

The polymerization process for making the branched polymers listed in Table 1 below, were carried out in a 500 ml round bottom reactor equipped with a mechanical stirrer, reflux condenser, thermocouple, heating mantle, and two separate inlet tubes for feeding initiator solution and neat monomer mixture. The polymerization temperature was regulated at a constant 85° C. during the course of the polymerization. The mechanical stirrer was run at a constant 130 RPM. The monomer mixture and initiator solution were fed at a variable-decreasing rate specified in FIG. 1 below. The initiator solution was prepared by dissolving 7.88 grams of Vazo® 52 initiator supplied by E. I. du Pont de Nemours and Company, Wilmington, Del. in 75.6 ml of methyl ethyl ketone. The solution was sparged with nitrogen to remove the oxygen. The monomer mixture was also sparged with nitrogen.

Initially, the reactor was charged with 36 ml of nitrogen sparged methyl ethyl ketone and the specified amount of cobalt chain transfer agent (CTA) known as Co(III)(DMG-BF2)2. Then, 27 grams of the specified monomer mixture, which was also sparged with nitrogen, was added. A small shot of 3.4 grams of initiator solution was added to start the reaction. Then, 46 grams of initiator solution and 162 grams of monomer mixture were added over the course of five hours according the polymerization Feed rate schedule shown in FIG. 1. At the conclusion of the monomer feed period, the initiator feed was continued for ½ hour at 0.1 grams per minute. At the conclusion of the post initiator feed, the reactor was held for one hour at the polymerization temperature and then cooled to room temperature.

TABLE 1

| Monomer Mixture for Branched Polymers | A:B Molar Ratio | Monomer Mixture* | | | Total Weight in grams | CTA in Grams |
|---|---|---|---|---|---|---|
| | | BMA (B) | HEA (A) | IBOA (A) | | |
| 1 | 1.21:1 | 40% | 14% | 46% | 189 | 0.019 |
| 2 | 1.43:1 | 40% | 30% | 30% | 189 | 0.038 |
| 3 | 1.30:1 | 40% | 20% | 40% | 189 | 0.038 |
| 4 | 1.43:1 | 40% | 30% | 30% | 189 | 0.075 |
| 5 | 1.30:1 | 40% | 20% | 40% | 189 | 0.038 |

*The weight percentages are based on the total weight solids of the monomer mixture.

The resulting branched polymers had the following properties shown below in Table 2:

TABLE 2

| Branched Polymers | % solids | Tg in ° C. | GPC Mn | GPC Mw |
|---|---|---|---|---|
| 1 | 69.8 | 27.57 | 8540 | 20,802 |
| 2 | 70.0 | 13.15 | 6413 | 16913 |
| 3 | 70.1 | 23.47 | 6504 | 15049 |
| 4 | 70.6 | 20.51 | 7300 | 20617 |
| 5 | 70.0 | 22.30 | 6927 | 16762 |

Branched Polymer 6

Acrylate:Methacrylate Mole Ratio of 1.47:1

To a glass reactor equipped with an agitator, condenser, two separate inlet tubes for initiator and monomer feeds, and under nitrogen atmosphere, and heated with a heating mantle, were added 125.7 parts methyl ketone, 21.0 parts acetoacetoxyethyl methacrylate, 6.3 parts 2-hydroxyethyl acrylate, 6.3 parts n-butyl acrylate, and 8.4 parts isobornyl acrylate, and 0.0419 parts cobalt chain transfer agent Co(III)

(DMG-BF2)2. Nitrogen was bubbled through the mixture, which was heated to reflux, 85° C. A mixture of 188.6 parts acetoacetoxyethyl methacrylate, 56.6 parts 2-hydroxyethyl acrylate, 56.6 parts n-butyl acrylate, and 75.4 parts isobornyl acrylate was sparged with nitrogen for 10 minutes and then fed over 360 minutes to the reactor. Simultaneously, a mixture of 8.4 parts Vazo® 52 initiator from E. I. du Pont de Nemours and Company, Wilmington, Del. and 146.7 parts methyl ethyl ketone, sparged with nitrogen, was fed to the reactor over 390 minutes. The reaction mixture was then cooled to room temperature and tested. The branched polymer composition was 40.5 mol % acetoacetoxyethyl methacrylate, 22.4 mol % 2-hydroxyethyl acrylate, 20.3 mol % n-butyl acrylate, and 16.7 mol % isobornyl acrylate, all in weight percentages on the total monomer mixture weight. The GPC Mw was 17044, wt % solids were 61.9%, and Gardner Holdt viscosity was F.

Branched Polymer 7

Acrylate:Methacrylate Mole Ratio of 1.55:1

To a glass reactor equipped with an agitator, condenser, two separate inlet tubes for initiator and monomer feeds, and under nitrogen atmosphere, and heated with a heating mantle, were added 125.3 parts methyl ethyl ketone, 21.0 parts acetoacetoxyethyl methacrylate, 8.4 parts 2-hydroxyethyl acrylate, 6.3 parts n-butyl acrylate, 6.3 parts isobornyl acrylate, and 0.0419 parts cobalt chain transfer agent Co(III)(DMG-BF2)2. Nitrogen was bubbled through the mixture which was heated to reflux, 85° C. A mixture of 188.6 parts acetoacetoxyethyl methacrylate, 75.4 parts 2-hydroxyethyl acrylate, 56.6 parts n-butyl acrylate, and 56.6 parts isobornyl acrylate was sparged with nitrogen for 10 minutes and then fed over 360 minutes to the reactor. Simultaneously, a mixture of 8.4 parts Vazo® 52 initiator from E. I. du Pont de Nemours and Company, Wilmington, Del. and 146.7 parts methyl ethyl ketone, sparged with nitrogen, was fed to the reactor over 390 minutes. The reaction mixture was then cooled to room temperature and tested. The branched polymer composition was 39.2 mol % acetoacetoxyethyl methacrylate, 29.0 mol % 2-hydroxyethyl acrylate, 19.7 mol % n-butyl acrylate, and 12.1 mol % isobornyl acrylate. The GPC Mw was 21112, wt % solids were 62.8%, and Gardner Holdt viscosity was I.

Branched Polymer 8

Acrylate:Methacrylate Mole Ratio of 1.61:1

To a glass reactor equipped with an agitator, condenser, two separate inlet tubes for initiator and monomer feeds, and under nitrogen atmosphere, and heated with a heating mantle, were added 125.7 parts methyl ethyl ketone, 21.0 parts acetoacetoxyethyl methacrylate, 8.4 parts 2-hydroxyethyl acrylate, 8.4 parts n-butyl acrylate, 4.2 parts isobornyl acrylate, and 0.0419 parts cobalt chain transfer agent Co(III)(DMG-BF2)2. Nitrogen was bubbled through the mixture which was heated to reflux, 85° C. A mixture of 188.6 parts acetoacetoxyethyl methacrylate, 75.4 parts 2-hydroxyethyl acrylate, 75.4 parts n-butyl acrylate, and 37.7 parts isobornyl acrylate was sparged with nitrogen for 10 minutes and then fed over 360 minutes to the reactor. Simultaneously, a mixture of 8.4 parts Vazo® 52 initiator from E. I. du Pont de Nemours and Company, Wilmington, Del. and 146.7 parts methyl ethyl ketone, sparged with nitrogen, was fed to the reactor over 390 minutes. The reaction mixture was then cooled to room temperature and tested. The branched polymer composition was 38.3 mol % acetoacetoxyethyl methacrylate, 28.2 mol % 2-hydroxyethyl acrylate, 25.6 mol % n-butyl acrylate, and 7.9 mol % isobornyl acrylate. The GPC Mw was 22773, wt % solids were 62.3%, and Gardner Holdt viscosity was I.

Comparative Polymer 1

A highly branched copolyester polyol was synthesized by esterifying dimethylolpropionic acid, pentaerythritol and ε-caprolactone as follows:

The following constituents in Table 3 below were charged into a 12-liter reactor equipped with a mechanical stirrer, thermocouple, short path distillation head with a water separator under nitrogen flow:

TABLE 3

| Dimethylolpropionic acid (DMPA) | 2063.4 |
| Pentaerythritol (PE) | 167.1 |
| Tin (II) 2-ethylhexanoate | 31.0 |
| Xylene | 108.3 |

The reaction mixture was heated to its reflux temperature and the water of reaction was collected from the water separator. The reaction progress was monitored by the amount of water collected, and the reaction temperature was not allowed to exceed 185° C. An additional 20 g of xylene was added throughout the reaction to maintain the reflux temperature below 185° C. When the amount of water collected approached theoretical (277 g), acid number measurements were used to determine the end point, which was an acid number of less than 5. At a measured acid number of 1.7, the reactor was allowed to cool to 120° C. Then, 4126.8 g of ε-caprolactone was added slowly over a 15–20 minute period through an addition funnel. The reactor was held at 120° C. until the solids exceeded 95%. Then the reactor was allowed to cool to 90° C. and the resulting polymer solution was thinned with 1391.8 g methyl amyl ketone. Forced air was used to cool the reactor to below 50° C.

The Comparative Polymer 1 had Mn of 5035, Mw/Mn of 1.68 (determined by GPC using polystyrene as a standard with a SEC high MW column), an OH# equal to 184.5, and a calculated –OH EW of 300.2. The polymer solution had 80.2% solids content, a Gardner Holdt viscosity of V+¼, and the final acid number was 2.1 corrected for solids. The Comparative Polymer 1 was further reduced to 65.5% solids content by the further addition of Methyl amyl ketone.

Comparative Polymer 4

Acrylate:Methacrylate Mole Ratio of 1.61:1

To a glass reactor equipped with an agitator, condenser, two separate inlet tubes for initiator and monomer feeds, and under nitrogen atmosphere, and heated with a heating mantle, were added 125.2 parts methyl ethyl ketone, 20.9 parts acetoacetoxyethyl methacrylate, 8.3 parts 2-hydroxyethyl acrylate, 8.3 parts n-butyl acrylate, and 4.2 parts isobornyl acrylate. Nitrogen was bubbled through the mixture which was heated to reflux, 85° C. A mixture of 187.8 parts acetoacetoxyethyl methacrylate, 75.1 parts 2-hydroxyethyl acrylate, 75.1 parts n-butyl acrylate, and 37.6 parts isobornyl acrylate was sparged with nitrogen for 10 minutes and then fed over 360 minutes to the reactor. Simultaneously, a mixture of 11.3 parts Vazo® 52 initiator from E. I. du Pont de Nemours and Company, Wilmington, Del. and 146.1 parts methyl ethyl ketone, sparged with nitrogen, was fed to the reactor over 390 minutes. The reaction mixture was then cooled to room temperature and tested. The branched polymer composition was 38.3 mol % acetoacetoxyethyl methacrylate, 28.2 mol % 2-hydroxyethyl acrylate, 25.6 mol % n-butyl acrylate, and 7.9 mol % isobornyl acrylate. The GPC Mw was 24043, wt % solids were 61.9%, and Gardner Holdt viscosity M.

Coatings

All the constituent in parts by weight of the crosslinkable and crosslinking components of Examples 1 through 6 and for each of Comparative Examples 1 through 4 are described in Tables 4, 5, 6 and 7 below:

TABLE 4

|  | Ex. 1 | Ex. 2 | Ex. 3 |
| --- | --- | --- | --- |
| Crosslinkable Component |  |  |  |
| Branched Polymer 4 | 30 | 30 |  |
| Branched Polymer 5 |  |  | 30 |
| Propylene glycol monomethyl ether acetate | 17.83 | 17.33 |  |
| Butyl acetate |  |  | 12.32 |
| Flow additive[1] | 0.33 | 0.34 | 0.28 |
| Catalyst solution[2] | 1.68 | 1.72 | 1.4 |
| Crosslinking Component |  |  |  |
| Polyisocyanate 1[3] | 11.32 | 9.62 | 7.11 |
| Polyisocyanate 2[4] |  | 3.43 |  |
| NCO/OH ratio | 1.05 | 1.05 | 1.05 |

TABLE 5

|  | Ex. 4 | Ex. 5 | Ex. 6 |
| --- | --- | --- | --- |
| Crosslinkable Component |  |  |  |
| Branched Polymer 5 | 30 |  |  |
| Branched Polymer 1 |  | 30 | 30 |
| Butyl acetate | 11.99 | 12.32 | 11.99 |
| Flow additive[1] | 0.29 | 0.28 | 0.29 |
| Catalyst solution[2] | 1.43 | 1.4 | 1.43 |
| Crosslinking Component |  |  |  |
| Polyisocyanate 1[3] | 6.04 | 7.11 | 6.04 |
| Polyisocyanate 2[4] | 2.15 |  | 2.15 |
| NCO/OH ratio | 1.05 | 1.05 | 1.05 |

[1]20% BYK 301 ® flow additive in Propylene glycol monomethyl ether acetate supplied by BYK-CHEMIE, Wallingford, Connecticut.
[2]1% Di butyl tin dilaurate in methyl ethyl ketone supplied by Elf-Atochem North America, Inc. Philadelphia, Pennsylvania.
[3]Tolonate ® HDT-Isocyanurate trimer of hexamethylene diisocyanate supplied by RHODIA INC., Cranbury, New Jersey.
[4]IPDI-T1890L - Trimer of Isophorone Diisocyanate from Degussa Corp/ Coatings & Colorants.

TABLE 6

(Comparative Examples)

|  | Comp. Ex. 1 | Comp. Ex. 2 | Comp. Ex. 3 |
| --- | --- | --- | --- |
| Crosslinkable Component |  |  |  |
| Comparative Polymer 1 | 30 | 30 |  |
| Comparative Polymer 2[1] |  |  | 30 |
| Propylene glycol monomethyl ether acetate | 22.26 | 11.25 |  |
| Butyl acetate |  |  | 14.8 |
| Flow additive[2] | 0.37 | 0.32 | 0.44 |
| Catalyst solution[3] | 1.86 | 1.6 | 2.17 |
| Crosslinking Component |  |  |  |
| Polyisocyanate 1[4] | 13.27 | 6.16 | 19.47 |
| Polyisocyanate 2[5] |  | 8.8 |  |
| NCO/OH ratio | 1.05 | 1.05 | 1.05 |

[1]Oligomer based on procedure #2 of U.S. Pat. No. 6,221,494 B1 @ 80% weight solids in Methyl Amyl Ketone.
[2]20% BYK 301 ® flow additive in Propylene glycol monomethyl ether acetate supplied by BYK-CHEMIE, Wallingford, Connecticut.
[3]1% Di butyl tin dilaurate in methyl ethyl ketone supplied by Elf-Atochem North America, Inc. Philadelphia, Pennsylvania.
[4]Tolonate ® HDT-Isocyanurate trimer of hexamethylene diisocyanate supplied by RHODIA INC., Cranbury, New Jersey.
[5]IPDI-T1890L - Trimer of Isophorone Diisocyanate from Degussa Corp/ Coatings & Colorants.

TABLE 7

(Comparative Examples)

|  | Comp. Ex. 4 | Comp. Ex. 5 |
| --- | --- | --- |
| Crosslinkable Component |  |  |
| Comparative Polymer 2[1] | 30 |  |
| Comparative Polymer 3[2] |  | 30 |
| Butyl acetate | 13.0 | 10.04 |
| Flow additive[3] | 0.45 | 0.23 |
| Catalyst solution[4] | 2.27 | 1.17 |
| Crosslinking Component |  |  |
| Polyisocyanate 1[5] | 15.02 | 5.44 |
| Polyisocyanate 2[6] | 9.2 |  |
| NCO/OH ratio | 1.05 | 1.05 |

[1]Oligomer based on procedure #2 of U.S. Pat. No. 6,221,494 B1 @80% weight solids in Methyl Amyl Ketone.
[2]58% solids in organic solvents of an acrylic polymer of S/MMA/IBMA/ HEMA having a Mn of 6200 and Mw 12,000 and prepared according to Example (Col. 5) U.S. Pat. No. 5,279,862.
[3]20% BYK 301 ® flow additive in Propylene glycol monomethyl ether acetate supplied by BYK-CHEMIE, Wallingford, Connecticut.
[4]1% Di butyl tin dilaurate in methyl ethyl ketone supplied by Elf-Atochem North America, Inc. Philadelphia, Pennsylvania.
[5]Tolonate ® HDT-Isocyanurate trimer of hexamethylene diisocyanate supplied by RHODIA INC., Cranbury, New Jersey.
[6]IPDI-T1890L - Trimer of Isophorone Diisocyanate from Degussa Corp/ Coatings & Colorants.

Viscosities

The viscosities of the aforedescribed branched polymers of the present invention were compared to the aforedescribed Comparative Polymer 1 and Comparative Polymer Solution 2 (60% solids in butyl acetate solvent of a linear acrylic polymer of S/EHMA/HEA having a Tg of 21C, HEW of 504 and Mw 14,700 and based on the procedure similar to that shown in Example (Col. 5) U.S. Pat. No. 5,279,862). The solids percentage of the polymer solution was adjusted at 60 weight percent and the viscosity in centipoise (cps) of these polymer solutions was measured at 100 RPM on a small sample Brookfield viscometer. The results are reported in Table 8 below:

TABLE 8

| Polymer Solutions | Tg in °C. | Est. Solvent Viscosity | Polymer Solution Viscosity |
|---|---|---|---|
| Polymer Solution 1[1] | +13.2 | 0.63 | 342 |
| Polymer Solution 2[2] | +23.5 | 0.63 | 208 |
| Comp. Polymer Solution 1[3] | −50 | 0.70 | 250 |
| Comp. Polymer Solution 2 | +21 | 0.68 | 895 |

[1]100 parts of Branched Polymer 2 (Mw 16,913 and HEW = 387 @ 70% solids in methyl ethyl ketone) in 16.67 parts of propylene glycol monomethyl ether acetate.
[2]100 parts of Branched Polymer 3 (Mw 15,049 and HEW = 580 @ 73.1% solids in methyl ethyl ketone) in 17.0 parts of propylene glycol monomethyl ether acetate and 4.83 parts of methyl ethyl ketone.
[3]100 parts of Comparative Polymer 1 (Mw 23,100 and HEW = 336 @ 65.6% solids in methyl amyl ketone) in 8.33 parts of methyl ethyl ketone.

From Table 8 it can be see that in overall viscosity comparisons:

At similar Tg's, molecular weights, and hydroxyl contents, the branched acrylic polymers of the present invention are much lower in viscosity than the corresponding standard linear acrylic polymers (200 to 350 cps versus 900 cps), and At similar Molecular weights and Hydroxyl contents, the branched acrylic polymers of the present invention have similar viscosities (342 cps versus 250 cps) as hyperbranched polyesters (Comparative Polymer 1) but at significantly higher Tgs (13° C. to 23° C. versus −50° C.).

Branched Polymer 8 with a highly branched structure is comparable to Comparative Polymer 4 of a linear structure (made without any cobalt-containing chain transfer agent) in its molecular weight and percentage solids (Mw=22773 and 62.3 wt % solids for Branched polymer 8 versus Mw=24043 and 61.9 wt % solids for Comparative Polymer 4) except viscosity of Branched Polymer 8 is I and that of Comparative Polymer 4 is M, i.e., a substantially lower viscosity. The foregoing comparison shows that a highly branched polymer of the present invention has a lower viscosity than a linear comparative polymer having comparable molecular weight and solids. Thus, the presence of the branched acrylic polymer of the present invention in a coating composition indicates a much-improved balance of molecular weight, Tg and viscosity when compared to the coating compositions containing linear acrylic polymers or branched polyesters.

Coating Properties

For each of Examples 1 through 6 and for each of Comparative Examples 1 through 4, all described below, the constituents of the crosslinkable component were charged into a mixing vessel in the order shown in Tables above and then the corresponding crosslinking component was charged into the mixing vessel and thoroughly mixed with to form pot mix for each of aforementioned Examples for each aforementioned Comparative Examples. A layer from each of the pot mixes was applied with a doctor blade over a separate phosphated cold roll steel test panel primed with a layer of PowerCron® Primer supplied by PPG, Pittsburgh, Penn., to a dry coating thickness of 50 micrometers. The coated panels were air dried at ambient temperature conditions. A second set of coated panels was baked for 20 minutes at 60° C. Then the panels were tested using the tests set forth in the aforedescribed test procedures. The test results for examples of the present invention are shown in the Tables 9, 10, 11, 12, 13 and 14 below and the test results for comparative examples in Tables 15, 16 and 17 below:

TABLE 9

| | Ex. 1 | Ex. 2 | Ex. 3 | Ex. 4 |
|---|---|---|---|---|
| Test Procedures | | | | |
| Percentage solids | 55 | 55 | 55 | 55 |
| ICI Viscosity (cps) | 119 | 125 | 110 | 110 |
| Time to gel (hr:min) | 0:30 | 0:30 | 0:36 | 0:38 |
| Swell Ratio | | | | |
| 1 day @ room temp | 1.53 | 1.66 | 1.62 | 1.69 |
| 7 day @ room temp | 1.60 | 1.75 | 1.59 | 1.63 |
| 30 day @ room temp | 1.46 | 1.55 | 1.61 | 1.59 |
| 60° C. bake - Initial | 1.62 | 1.63 | 1.65 | 1.68 |
| 60° C. bake + 1 day @ room temp | 1.67 | | 1.61 | 1.62 |
| 60° C. bake + 7 days @ room temp | 1.49 | 1.47 | 1.59 | 1.60 |
| 60° C. bake + 30 days @ room temp | 1.46 | 1.52 | 1.59 | 1.57 |
| Gel Fraction | | | | |
| 30 days @ room temp | 95.23 | 94.35 | 95.37 | 95 |
| 60° C. bake + 30 days @ room temp | 95.86 | 94.65 | 95.95 | 95.75 |

TABLE 10

| | Ex. 5 | Ex. 6 |
|---|---|---|
| Test Procedures | | |
| Percentage solids | 55 | 55 |
| ICI Viscosity (cps) | 200 | 180 |
| Time to gel (hr:min) | 0:25 | 0:30 |
| Swell Ratio | | |
| 1 day @ room temp | 1.66 | 1.66 |
| 7 day @ room temp | 1.60 | 1.61 |
| 30 day @ room temp | 1.57 | 1.59 |
| 60° C. bake - Initial | 1.66 | 1.70 |
| 60° C. bake + 1 day @ room temp | 1.59 | 1.61 |
| 60° C. bake + 7 days @ room temp | 1.58 | 1.57 |
| 60° C. bake + 30 days @ room temp | 1.59 | 1.57 |
| Gel Fraction | | |
| 30 days @ room temp | 95.58 | 95.19 |
| 60° C. bake + 30 days @ room temp | 95.83 | 95.35 |

TABLE 11

| | Ex. 1 | Ex. 2 | Ex. 3 | Ex. 4 |
|---|---|---|---|---|
| Test Procedures | | | | |
| BK3 Time (Minutes) | 66.14 | 51.97 | 88.5 | 66.1 |
| BK4 Time (Minutes) | 82.68 | 61.42 | 123.9 | 136.9 |
| Cotton Time (minutes) | 60.0 | 60.0 | 76 | 113 |
| Appearance-Wet | OK | OK | OK | OK |
| Appearance/Clarity-Dry | OK | OK | OK | OK |
| Water Spot | | | | |
| 4 Hours @ Room Temp. | 10 | 10 | 9 | 9 |
| 1 day @ Room Temp. | 10 | 10 | 9 | 10 |
| 60° C. Bake - initial | 10 | 10 | 9 | 10 |
| 60° C. Bake + 1 day@ Room Temp. | 10 | 10 | 10 | 10 |
| MEK Rubs | | | | |
| 4 Hours @ Room Temp. | 600 | 600 | 700 | 600 |
| 1 day @ Room Temp. | 600 | 500 | 900 | 800 |

TABLE 11-continued

|  | Ex. 1 | Ex. 2 | Ex. 3 | Ex. 4 |
|---|---|---|---|---|
| 60° C. Bake - initial | 600 | 600 | 800 | 900 |
| 60° C. Bake + 1 day @ Room Temp. | 600 | 600 | 800 | 900 |
| 30 days @ Room Temp. | 800 | 800 | 900 | 800 |
| 60° C. Bake + 30 days @ Room Temp. | 1000 | 800 | 800 | 800 |

TABLE 12

| Test Procedures | Ex. 5 | Ex. 6 |
|---|---|---|
| BK3 Time (Minutes) | 66.1 | 69 |
| BK4 Time (Minutes) | 106.2 | 118 |
| Cotton Time (minutes) | 125 | 90 |
| Appearance-Wet | OK | OK |
| Appearance/Clarity-Dry | OK | OK |
| Water Spot | | |
| 4 Hours @ Room Temp. | 10 | 10 |
| 1 day @ Room Temp. | 10 | 10 |
| 60° C. Bake - initial | 9 | 10 |
| 60° C. Bake + 1 day @ Room Temp. | 10 | 10 |
| MEK Rubs | | |
| 4 Hours @ Room Temp. | 700 | 500 |
| 1 day @ Room Temp. | 800 | 800 |
| 60° C. Bake - initial | 800 | 900 |
| 60° C. Bake + 1 day @ Room Temp. | 800 | 950 |
| 30 days @ Room Temp. | 800 | 800 |
| 60° C. Bake + 30 days @ Room Temp. | 800 | 850 |

TABLE 13

| Test Procedures | Ex. 1 | Ex. 2 | Ex. 3 | Ex. 4 |
|---|---|---|---|---|
| Persoz hardess | | | | |
| 4 hours @ room temp. | 36 | 44 | 29 | 31 |
| 1 day @ room temp. | 139 | 158 | 153 | 163 |
| 60° C. Bake - initial | 125 | 160 | 159 | 190 |
| 60° C. Bake + 1 day @ Room Temp. | 169 | 189 | 205 | 208 |
| Fisher Hardness | | | | |
| 1 day @ room temp. | 55.9 | 78.7 | 36.5 | 45.5 |
| 7 days @ room temp. | 100 | 123 | 59 | 84 |
| 30 days @ room temp. | 129 | 143 | 123 | 115 |
| 60° C. Bake - initial | 38 | 55.1 | 59 | 90 |
| 60° C. Bake + 1 day @ Room Temp. | 73.6 | 93 | 75 | 103 |
| 60° C. Bake + 7 days @ Room Temp. | 103 | 116 | 97 | 78 |
| 60° C. Bake + 30 days @ Room Temp. | 127 | 141 | 117 | 129 |

TABLE 14

| Test Procedures | Ex. 5 | Ex. 6 |
|---|---|---|
| Persoz hardess | | |
| 4 hours @ room temp. | 31 | 37 |
| 1 day @ room temp. | 154 | 178 |
| 60° C. Bake - initial | 192 | 190 |
| 60° C. Bake + 1 day @ Room Temp. | 202 | 250 |

TABLE 14-continued

| Test Procedures | Ex. 5 | Ex. 6 |
|---|---|---|
| Fisher Hardness | | |
| 1 day @ room temp. | 29.8 | 48.2 |
| 7 days @ room temp. | 65 | 90 |
| 30 days @ room temp. | 102 | 117 |
| 60° C. Bake - initial | 59 | 62 |
| 60° C. Bake + 1 day @ Room Temp. | 77 | 86 |
| 60° C. Bake + 7 days @ Room Temp. | 81 | 98 |
| 60° C. Bake + 30 days @ Room Temp. | 118 | 134 |

TABLE 15

| Test Procedures | Comp. Ex. 1 | Comp. Ex. 2 | Comp. Ex. 3 | Comp. Ex. 4 | Comp. Ex. 5 |
|---|---|---|---|---|---|
| Percentage solids | 55 | 55 | 65 | 65 | 50 |
| ICI Viscosity (cps) | 75 | 130 | 59 | 70 | 139 |
| Time to gel (hr:min) | 0:30 | 0:46 | 1:00 | 1:30 | 1:10 |
| Swell Ratio | | | | | |
| 1 day @ room temp | 1.62 | 1.71 | 2.45 | 2.22 | 2.11 |
| 7 day @ room temp | 1.57 | 1.7 | 1.99 | 1.86 | 1.8 |
| 30 day @ room temp | 1.57 | 1.67 | 1.72 | 1.68 | 1.68 |
| 60° C. bake - Initial | 1.67 | 1.99 | 2.65 | 2.33 | 2.35 |
| 60° C. bake + 1 day @ room temp | 1.61 | 1.8 | 2.34 | 2.32 | 2.14 |
| 60° C. bake + 7 days @ room temp | 1.57 | 1.68 | 1.94 | 1.69 | 1.77 |
| 60° C. bake + 30 days @ room temp | 1.62 | 1.65 | 1.72 | 1.72 | 1.76 |
| Gel Fraction | | | | | |
| 30 days @ room temp | 98.67 | 99.05 | 98.06 | 98.26 | 92.86 |
| 60° C. bake + 30 days @ room temp | 98.67 | 99.22 | 98.11 | 98.85 | 92.55 |

TABLE 16

| Test Procedures | Comp. Ex. 1 | Comp. Ex. 2 | Comp. Ex. 3 | Comp. Ex. 4 | Comp. Ex. 5 |
|---|---|---|---|---|---|
| BK3 Time (Minutes) | 35.4 | 94 | 383 | 451 | 80 |
| BK4 Time (Minutes) | 57.8 | 111 | 536 | >600 | 267 |
| Cotton Time (minutes) | 110 | 120 | 330 | 360 | 30 |
| Appearance-Wet | OK | OK | OK | OK | OK |
| Appearance/Clarity-Dry | OK | Some haze | OK | OK | OK |
| Water Spot | | | | | |
| 4 Hours @ Room Temp. | 8 | 9 | 4 | 3 | 8 |
| 1 day @ Room Temp. | 8 | 9 | 7 | 8 | 9 |
| 60° C. Bake - initial | 10 | 9 | 8 | 7 | 9 |
| 60° C. Bake + 1 day @ Room Temp. | 10 | 9 | 10 | 8 | 10 |
| MEK Rubs | | | | | |
| 4 Hours @ Room Temp. | 850 | 900 | 400 | 100 | 300 |
| 1 day @ Room Temp. | 1000 | 900 | 400 | 200 | 500 |
| 60° C. Bake - initial | 900 | 900 | 500 | 300 | 500 |
| 60° C. Bake + 1 day @ Room Temp. | 1000 | 900 | 500 | 400 | 600 |
| 30 days @ Room Temp. | 850 | 900 | 800 | 900 | 500 |
| 60° C. Bake + 30 days @ Room Temp. | 950 | 950 | 900 | 500 | 500 |

TABLE 17

| Test Procedures | Comp. Ex. 1 | Comp. Ex. 2 | Comp. Ex. 3 | Comp. Ex. 4 | Comp. Ex. 5 |
|---|---|---|---|---|---|
| Persoz hardess | | | | | |
| 4 hours @ room temp. | 62 | 29 | 16 | 23 | 106 |
| 1 day @ room temp. | 43 | 37 | 118 | 145 | 211 |
| 60° C. Bake - initial | 51 | 24 | 172 | 113 | 199 |
| 60° C. Bake + 1 day @ Room Temp. | 40 | 32 | 165 | 195 | 265 |
| Fisher Hardness | | | | | |
| 1 day @ room temp. | 22.8 | 11 | 21.5 | 29 | 81.9 |
| 7 days @ room temp. | 17.5 | 18 | 128 | 157 | 141 |
| 30 days @ room temp. | 33.7 | 19 | 181 | 173 | 154 |
| 60° C. Bake - initial | 16 | 6 | 51.7 | 25 | 75.2 |
| 60° C. Bake + 1 day @ Room Temp. | 20 | 11 | 102 | 72 | 101 |
| 60° C. Bake + 7 days @ Room Temp. | 22 | 20 | 165 | 174 | 158 |
| 60° C. Bake + 30 days @ Room Temp. | 18.4 | 21 | 193 | 184 | 172 |

From the foregoing, it can be readily seen that that due to the higher Tg of the branched polymers of the present invention, coatings resulting therefrom provide higher film hardness than those coatings resulting from comparative polymers.

The composition containing the branched polymers of the present invention provides excellent reactivity at room temperatures. As a result the coatings resulting therefrom can dry rapidly under ambient conditions, which can be noted by their improved BK dry times, water spot resistance and cotton times over compositions containing the comparative polymers. As a result, the compositions of the present invention provide a significant improvement in productivity over comparative compositions. The overall coating properties of the coating compositions are excellent with excellent compatibility with various crosslinking component combinations, such as a combination of HDI and IPDI trimers.

The coating compositions of the present invention have significantly improved early cure properties, such as BK dry times, water spots, cotton times and swell ratios over those disclosed in the U.S. Pat. No. 6,221,494.

The compositions containing the branched polymers of the present invention provide improved early cure, swell ratios, MEK resistance, Water spots, through cure, BK4 times, better gel fraction and lower viscosity at higher solids loading (119 cps @ 55% solids versus 139 cps @ 50% solids) than conventional coating compositions containing conventional linear acrylic polymers.

Figure 2:
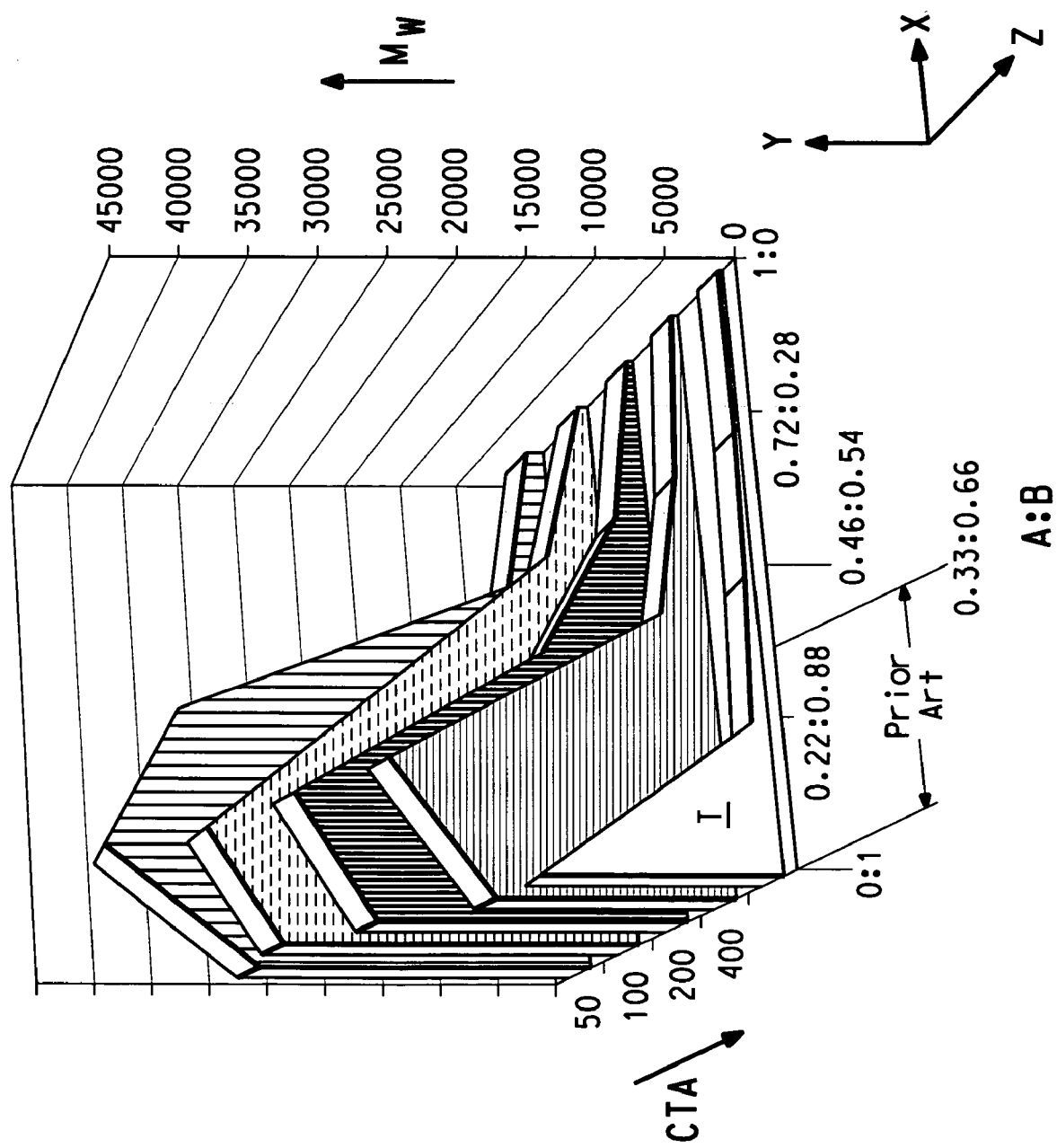
FIG. 2 shows the molecular weight and the degree of branching attained in branched polymers at various molar fractions of a B monomer in the monomer mixture and at various amounts of chain transfer agent used during the polymerization.

U.S. Pat. No. 6,624,261 which issued on Sep. 23, 2003, disclosed that a polymer having a highly branched polymer structure was produced by decreasing the ratio of the previously described monomers A and B in a monomer mixture from 1000:1 towards 2:1. Applicants have unexpectedly discovered that a polymer having a branched polymer structure can be produced beyond the range previously disclosed in the foregoing patent application. FIG. 2 graphically illustrates the degree of branching, which is directly proportional to the molecular weights of the branched polymers described in Tables 18 and 19 below, which were produced in accordance with the procedure described earlier. In FIG. 2, "Z" axis represents the GPC molecular weight of the polymers, "X" axis represent the mole fraction of the B monomer in the monomer mixture, and "Y" axis represents the amount of chain transfer agent used. For comparison, the theoretical graph noted by "T" illustrates the molecular weights of the theoretical polymers without any branching @ 400 ppm of cobalt chain transfer agent. The theoretical molecular weights represented by the graph T in FIG. 2 are calculated by using the following equation:

$$\frac{1}{Mw} = \frac{1}{Mw_{\chi=0}} + \chi \frac{1}{Mw_{\chi=1}}$$

wherein $\chi$ represents mole fraction of B monomer in the monomer mixture, Mw represents the molecular weight of the theoretical polymer having no branched structure, $Mw_{\chi=0}$ represents the molecular weight of a polymer having no 'B' monomer in the monomer mixture and $Mw_{\chi=1}$ represents the molecular weight of a polymer having no 'A' monomer in the monomer mixture.

TABLE 18

| Monomer Mixture for Branched Polymers | A:B Molar Ratio | % Mole fraction of B | Monomer Mixture* % MA (A) | Monomer Mixture* % MMA (B) | Total Weight In grams | CTA in grams | GPC Mw |
|---|---|---|---|---|---|---|---|
| 9 | 28:72 | 72 | 25 | 75 | 189 | 0.075 | 1114 |
| 10 | 54:46 | 46 | 50 | 50 | 189 | 0.075 | 3484 |
| 11 | 28:72 | 72 | 25 | 75 | 189 | 0.038 | 1756 |
| 12 | 54:46 | 46 | 50 | 50 | 189 | 0.038 | 8362 |
| 13 | 28:72 | 72 | 25 | 75 | 189 | 0.019 | 2649 |
| 14 | 54:46 | 46 | 50 | 50 | 189 | 0.019 | 17,568 |
| 15 | 28:72 | 72 | 25 | 75 | 189 | 0.094 | 3522 |
| 16 | 54:46 | 46 | 50 | 50 | 189 | 0.094 | 32,198 |

*The weight percentages are based on the total weight solids of the monomer mixture.

TABLE 19

(Comparative Polymers)

| Monomer Mixture for Comp. Polymers | A:B Molar Ratio | % Mole fraction of B | Monomer Mixture* | | Total Weight | CTA | Mw |
|---|---|---|---|---|---|---|---|
| | | | % MA (A) | % MMA (B) | | | |
| 5 | 78:22 | 22 | 75 | 25 | 189 | 0.075 | 24,727 |
| 6 | 78:22 | 22 | 75 | 25 | 189 | 0.038 | 29,270 |
| 7 | 78:22 | 22 | 75 | 25 | 189 | 0.019 | 33,798 |
| 8 | 0:100 | 0 | 100 | 0 | 189 | 0.075 | 17,629 |
| 9 | 0:100 | 0 | 100 | 0 | 189 | 0.038 | 23,191 |
| 10 | 0:100 | 0 | 100 | 0 | 189 | 0.019 | 28,012 |
| 11 | 100:0 | 100 | 0 | 100 | 189 | 0.075 | 275 |
| 12 | 100:0 | 100 | 0 | 100 | 189 | 0.038 | 330 |
| 13 | 100:0 | 100 | 0 | 100 | 189 | 0.019 | 614 |
| 14 | 0:100 | 0 | 100 | 0 | 189 | 0.094 | 28,208 |
| 15 | 100:0 | 100 | 0 | 100 | 189 | 0.094 | 1382 |
| 16 | 78:22 | 22 | 75 | 25 | 189 | 0.094 | 40,165 |

*The weight percentages are based on the total weight solids of the monomer mixture.

From FIG. 2 one can readily ascertain that branched polymers can be produced even beyond the A:B molar ratios disclosed in the '467 application. Moreover, the polymers of the present invention can have low molecular weights and still provide a useful degree of branching. As a result, coating compositions containing such branched polymers can not only have lower viscosity than linear polymers at low molecular weights but such compositions can also, due to the presence of branching, provide very useful coating properties, such as high hardness and high crosslink density. Such compositions having high crosslink density cure rapidly, even under ambient conditions.

What is claimed is:

1. A curable coating composition comprising a crosslinkable component and a crosslinking component wherein said crosslinkable component comprises:

a branched acrylic polymer having a weight average molecular weight ranging from 2000 to 200,000, Tg ranging from −70° C. to +150° C., having on average 2 to 2000 crosslinkable groups, said acrylic polymer resulting from a free radical polymerization of a monomer mixture in the presence of a cobalt-containing chain transfer agent, said monomer mixture comprising at least two unsaturated monomers A and B of the formula:

$CH_2=CXY$ wherein, a molar ratio of said monomer A to said monomer B in said monomer mixture ranges from 1.99:1 to 1:9;

in the range of from 75% to 100% of said monomers A and B in said monomer mixture are converted into said polymer;

X for monomer A is H and X for monomer B is $CH_3$;

Y is selected from the group consisting of OR, $O_2CR$, halogen, $CO_2H$, COR, $CO_2R$, CN, $CONH_2$, CONHR, $CONR_2$ and R'; wherein R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, halo, acetoacetyl, and combinations thereof, R' is selected from the group consisting of substituted and unsubstituted aryl, and substituted and unsubstituted heteroaryl, the substituents being the same or different and selected from the crosslinkable group consisting of carboxyl, carboxylate, epoxy, silyl, hydroxyl, alkoxy, primary amino, secondary amino, tertiary amino, isocyanato, sulfonyl, substituted and unsubstituted alkyl, substituted and unsubstituted aryl, substituted and unsubstituted alkenyl, halo, and acetoacetyl; wherein hetero atom in said heteroaryl group is N, O, P or S, and the number of carbon atoms in:

(i) said alkyl group range from 1 to 18, and (ii) said aryl group range from 6 to 18; and wherein said crosslinking component for said crosslinkable groups comprises a polyamine, a polyketimine, polyaldimine, polyepoxy, polyisocyanate, polyol, silane, melamine, polyaspartic ester, polyanhydride, polyacid or a combination thereof.

2. The coating composition of claim 1 wherein said crosslinkable groups are selected from the group consisting of hydroxyl, acetoacetoxy, carboxyl, primary amine, secondary amine, isocyanato, silyl, epoxy and a combination thereof.

3. The coating composition of claim 1 wherein said monomer mixture further comprises styrene, α-methyl styrene or a combination thereof.

4. The coating composition of claim 1 wherein in said monomer mixture said A monomer is isobornyl acrylate, hydroxy ethyl acrylate, or a combination thereof and said B monomer is butyl methacrylate.

5. The coating composition of claim 1 wherein said monomer mixture comprises 10 to 20,000 ppm of a cobalt-containing chain transfer agent, all ppm being based on the total weight of monomer mixture.

6. The coating composition of claim 1 or 5 wherein said cobalt-containing chain transfer agent is selected form the group consisting of a cobalt(II) chelate, cobalt(III) chelate, and a combination thereof.

7. The coating composition of claim 1 wherein when said branched polymer has said acetoacetoxy functional groups, said crosslinking component is ketimine or polyamine.

8. The coating composition of claim 1 wherein when said branched polymer has said hydroxyl functional groups, said crosslinking component is polyisocyanate.

9. The coating composition of claim 1 wherein when said branched polymer has said epoxy functional groups, said crosslinking component is polyacids or polyanhydride.

10. The coating composition of claim 1 wherein when said branched polymer has said silyl functional groups, said crosslinking component is silane.

11. The coating composition of claim 8 wherein said the crosslinkable component further comprises aldimine oligomers, ketimine oligomers and polyaspartic esters.

12. The coating composition of claim 1 wherein when said branched polymer has said hydroxyl functional groups, said crosslinking component is melamine.

13. The coating composition of claim 8 wherein said crosslinkable component further comprises a catalyst selected from the group consisting of a tin compound, tertiary amine, acid catalyst and a combination thereof.

14. The composition of claim 12 further comprises a catalyst selected from the group consisting of sulfonic acids, phosphoric acids, and combinations thereof.

15. The coating composition of claim 1 wherein said composition is a clear coating composition, pigmented composition, metallized coating composition, basecoat composition, monocoat composition or a primer.

16. The coating composition of claim 1 wherein said crosslinkable component further comprises 0.1 weight percent to 98 weight percent based on the total weight of the crosslinkable component solids of a hydroxyl containing (meth)acrylic polymer, a polyester, an oligomer, a polytrimethylene ether diol, a non-aqueous dispersed (NAD) polymer or a combination thereof.

17. The coating composition of claim 16 wherein said oligomer is a reactive oligomer produced by reacting an oligomeric acid with a monofunctional epoxy.

18. The coating composition of claim 1 wherein said crosslinkable component further comprises 0.1 to 50 weight percent of a dispersed acrylic polymer, the percentage being based on the total weight of the composition solids.

* * * * *